(12) United States Patent
Wright

(10) Patent No.: US 10,198,879 B2
(45) Date of Patent: *Feb. 5, 2019

(54) METHOD AND SYSTEM FOR LOGGING VEHICLE BEHAVIOUR

(71) Applicant: Andrew William Wright, Surrey (GB)

(72) Inventor: Andrew William Wright, Surrey (GB)

(73) Assignees: Andrew William Wright, Virginia Water (GB); Gillian Switalski, Virginia Water (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/454,952

(22) Filed: Mar. 9, 2017

(65) Prior Publication Data

US 2017/0178424 A1    Jun. 22, 2017

Related U.S. Application Data

(63) Continuation of application No. 15/061,910, filed on Mar. 4, 2016, now Pat. No. 9,633,487, which is a
(Continued)

(30) Foreign Application Priority Data

Dec. 15, 2010 (GB) .................................. 1021292.6
Jan. 25, 2011 (GB) .................................. 1101259.8
(Continued)

(51) Int. Cl.
*G07C 5/02* (2006.01)
*H04M 1/60* (2006.01)
(Continued)

(52) U.S. Cl.
CPC .............. *G07C 5/02* (2013.01); *G06F 17/00* (2013.01); *G06Q 40/08* (2013.01); *G07C 5/008* (2013.01);
(Continued)

(58) Field of Classification Search
USPC ......................................................... 701/50
See application file for complete search history.

(56) References Cited

U.S. PATENT DOCUMENTS 4,992,943 A    2/1991  McCracken
5,638,273 A    6/1997  Coiner et al.
(Continued)

FOREIGN PATENT DOCUMENTS

EP    1615178 A2    1/2006
EP    1764749 A2    3/2007
(Continued)

OTHER PUBLICATIONS

Barbeau et al.; "TRAC-IT—A Software Architecture Supporting Simutaneous Travel Behavior Data Collection & Real-time Location-Based Services for GPS-Enabled Mobile Phones"; Proceedings of the Nat'l Academy of Sciences Transportation Research Board 88th Annual Meeting; Paper #09-3175; Jan. 2009; 20 pages.
(Continued)

*Primary Examiner* — Tyler D Paige
(74) *Attorney, Agent, or Firm* — Baker & Hostetler LLP

(57) ABSTRACT

Methods and systems for logging driving information associated with a vehicle when driven are disclosed. In one aspect, a mobile telecommunications device is provided that is adapted for installation to a vehicle and configured to log driving information associated with the vehicle when driven. The mobile device is arranged to register the start of a driving period during which the mobile device is installed to the vehicle and the vehicle is being driven by a driver. The mobile device is also arranged to process sensor data during the driving period to derive driving information associated with how the vehicle is driven. The mobile device is also arranged to store a selection of the driving information to a memory.

55 Claims, 25 Drawing Sheets

Related U.S. Application Data continuation of application No. 13/994,455, filed as application No. PCT/GB2011/052491 on Dec. 15, 2011, now Pat. No. 9,311,271.

(30) Foreign Application Priority Data

| Jun. 10, 2011 | (GB) | .................................. | 1109759.9 |
| Oct. 31, 2011 | (GB) | .................................. | 1118777.0 |

(51) Int. Cl.

| *G07C 5/00* | (2006.01) |
| *G07C 5/08* | (2006.01) |
| *H04M 1/725* | (2006.01) |
| *G06F 17/00* | (2006.01) |
| *G09B 19/14* | (2006.01) |
| *G06Q 40/08* | (2012.01) |
| *G09B 5/02* | (2006.01) |

(52) U.S. Cl.
CPC ......... *G07C 5/0858* (2013.01); *G07C 5/0866* (2013.01); *G09B 5/02* (2013.01); *G09B 19/14* (2013.01); *H04M 1/6041* (2013.01); *H04M 1/6075* (2013.01); *H04M 1/7253* (2013.01); *H04M 1/72525* (2013.01); *H04M 1/72527* (2013.01); *H04M 1/72569* (2013.01); *H04M 2201/36* (2013.01); *H04M 2250/12* (2013.01); *H04M 2250/74* (2013.01)

(56) References Cited

U.S. PATENT DOCUMENTS

| 7,756,617 | B1 | 7/2010 | Cluff et al. |
| 7,765,058 | B2 | 7/2010 | Doering |
| 7,908,191 | B1 | 3/2011 | Dinamani et al. |
| 8,140,358 | B1 | 3/2012 | Ling et al. |
| 8,554,468 | B1 | 10/2013 | Bullock |
| 8,781,442 | B1 | 7/2014 | Link, II |
| 9,311,271 | B2 | 4/2016 | Wright |
| 9,633,487 | B2 | 4/2017 | Wright |
| 2005/0030224 | A1 | 2/2005 | Koch |
| 2005/0046584 | A1 | 3/2005 | Breed |
| 2006/0103513 | A1 | 5/2006 | Ihara et al. |
| 2007/0135979 | A1 | 6/2007 | Plante |
| 2007/0135980 | A1 | 6/2007 | Plante |
| 2007/0150139 | A1 | 6/2007 | Hardy |
| 2007/0208503 | A1 | 9/2007 | Harnsberger |
| 2007/0219685 | A1 | 9/2007 | Plante |
| 2008/0255722 | A1 | 10/2008 | McClellan et al. |
| 2009/0109037 | A1 | 4/2009 | Farmer |
| 2009/0157255 | A1 | 6/2009 | Plante |
| 2010/0030540 | A1* | 2/2010 | Choi ..................... G01S 5/0027 703/8 |
| 2010/0039254 | A1 | 2/2010 | Cooper et al. |
| 2010/0131307 | A1 | 5/2010 | Collopy et al. |
| 2010/0157061 | A1* | 6/2010 | Katsman ................ G07C 5/008 348/149 |
| 2010/0317314 | A1 | 12/2010 | Roland |
| 2011/0112717 | A1 | 5/2011 | Resner |
| 2011/0117856 | A1 | 5/2011 | Veluppillai et al. |
| 2011/0160964 | A1 | 6/2011 | Obradovich |
| 2011/0212717 | A1 | 9/2011 | Rhoads et al. |
| 2012/0072244 | A1 | 3/2012 | Collins |
| 2012/0166583 | A1* | 6/2012 | Koonce ............. G06F 17/30861 709/217 |
| 2013/0060583 | A1 | 3/2013 | Collins et al. |
| 2013/0302758 | A1 | 11/2013 | Wright |
| 2017/0178422 | A1 | 6/2017 | Wright |

FOREIGN PATENT DOCUMENTS

| EP | 2177811 A2 | 4/2010 |
| JP | 2008-244674 A | 10/2008 |
| WO | WO 2006/075419 A1 | 7/2006 |
| WO | WO 2006/127534 A1 | 11/2006 |
| WO | WO 2007/067775 A2 | 6/2007 |

OTHER PUBLICATIONS

Barbeau et al.; "Dynamic Management of Real-Time Location Data on GPS-Enabled Mobile Phones"; The 2$^{nd}$ Int'l Conf. on Mobile Ubiquitous Computing, Systems, Services and Techniques; 2008; p. 343-348.

Meyer, Stefan; "Fahrtenbuch—iPhone Apps Plus"; https://web.archive.org/web/20091210215707/http://www.iphoneappsplus.com/business/fahrtenbuch/index.htm; retrieved Jan. 19, 2016; 2 pages (XP055242544).

"iPhone & iPad iOS Entwicklung"; NeuMedienFraktion; http://www.neuemedienfraktion.de/iPhone/iPhone.html; retrieved Jan. 19, 2016; 2 pages (XP055242566).

Kanjo et al.; "MobGeoSen: facilitating personal geosensor data collection and visualization using mobile phones"; Personal and Ubiquitous Computing; vol. 12 No. 8; 2008; p. 599-607.

European Patent Application No. 11813683.7; Office Action Article 94(3); dated Jan. 26, 2016; 6 pages.

* cited by examiner 230 218

Back | Witness Details

Full name of witness
[ ]

House number or name
[ ]

Street name
[ ]

Postal town or city name
[ ]

Postal / Zip code
[ ]

Home telephone number
[ ]

Back  Drivers Details

Full name of driver

House number or name

Street name

Postal town or city name

Postal / Zip code

Home telephone number

Fig. 18

METHOD AND SYSTEM FOR LOGGING VEHICLE BEHAVIOUR

CROSS-REFERENCE TO RELATED APPLICATIONS

This application is a continuation of U.S. patent application Ser. No. 15/061,910 filed Mar. 4, 2016, which is a continuation of U.S. patent application Ser. No. 13/994,455 filed Jul. 24, 2013 and now issued as U.S. Pat. No. 9,311,271, which is a 371 of international patent application PCT/GB2011/052491 filed Dec. 15, 2011, which claims foreign priority to GB patent application no. 1118777.0 filed Oct. 31, 2011, GB patent application no. 1109759.9 filed Jun. 10, 2011, GB patent application no. 1101259.8 filed Jan. 25, 2011, and GB patent application no. 1021292.6 filed Dec. 15, 2010, the contents of which are incorporated in their entirety as if fully presented herein.

FIELD OF THE INVENTION

The present invention relates to methods and systems for logging driving information associated with vehicle behaviour. Moreover, the present invention relates to a mobile device adapted for installation to a vehicle and configured to log such driving information, for example, video footage associated with how the vehicle is driven. Such driving information may subsequently be utilised to determine the cause of an event such as an accident, to modify driver behaviour and/or to determine insurance premiums.

BACKGROUND

Data logging devices are commonly installed on aircraft that log data about events associated with the behaviour of the aircraft and also the crew controlling the aircraft. Such data logging devices are commonly termed "black boxes" and are very useful for determining the cause of problems that have effected the aircraft, especially when no other record of a significant event such as a crash exists.

Similar data logging devices exist for road vehicles, and can be used to realise similar advantages. Vehicle users as well as authorities can use such devices to determine the cause of traffic accidents or other vehicle-related events, whether these stem from a vehicle malfunction or driver negligence. For example, the data logged by these devices can be used as evidence for insurance claims and so potentially to determine insurance premiums.

Some of these data logging devices can be integrated with the car data network, and so may take inputs from sensors integrated with the vehicle, such as those measuring the speed of the vehicle. However, these can be difficult and costly to install. Others having their own internal sensor set are more readily retrofitted to a vehicle. Nonetheless, such data logging devices for road vehicles are less prevalent perhaps due to their unjustifiable expense. Accordingly the uptake of data logging devices that can be retrofitted to road vehicles, as are known in the art, has been minimal.

It is the object of the present invention to alleviate the above-mentioned problems, at least in part.

SUMMARY OF THE INVENTION

According to a first aspect of the present invention there is provided a mobile telecommunications device adapted for installation to a vehicle and configured to log driving information associated with the vehicle when driven, the mobile device comprising: a sensor set comprising at least one of an image sensor, an audio sensor, an accelerometer and a positioning module; a processor for processing sensor data from the sensor set to derive said driving information; a memory for storing said derived driving information; and a wireless telecommunications module operable to download an application; the mobile device being arranged to execute the downloaded application to control the mobile device to: register the start of a driving period during which the mobile device is installed to the vehicle and the vehicle is being driven by a driver; process sensor data from the sensor set during the driving period to derive driving information associated with how the vehicle is driven; and store a selection of the driving information to the memory.

Advantageously, the use of a mobile telecommunication device enables a data logging device to be conveniently and inexpensively retrofitted to a vehicle. Mobile telecommunication devices such as "smart-phones" are becoming increasingly widespread, and these devices tend to have the requisite sensor sets to capture data concerning vehicle behaviour. Thus, a generic mobile telecommunication device already owned by a driver of the vehicle can be loaded with the application to provide such data logging functionality that would otherwise necessitate a dedicated black-box. Thus, the functionality of a black-box can be realised without additional expense.

Following on from this, it will be appreciated that the mobile device is ideally a portable mobile telecommunication device. Ideally, the mobile device is a hand-portable mobile device. Advantageously, the portability permits the mobile device to be conveniently fitted to and removed from the vehicle.

Furthermore, such a mobile telecommunication device presents additional advantages over known dedicated black-box systems as the data logging functionality of the mobile telecommunication device can be continually refined. This can be achieved without physically upgrading the hardware of the device, and also without significant user intervention. Specifically, the application may be arranged to determine whether a software update exists and if so, control the mobile device to download at least portions of an improved version of the application. Conveniently, downloading may be via the wireless telecommunication module. Said downloading may be automatic, or may be user-confirmed. For the avoidance of doubt, the application will typically be stored on a portion of the memory of the mobile device and executed therefrom, as is known in the art. Also, it will be appreciated that the application, or portion thereof may be downloaded via the wireless telecommunication module and/or via an intermediary device. For example the application may be side-loaded to the mobile device from an intermediary computing device.

The application may be sourced from an application store and/or content provider. For example, the content provider may comprise the Apple® Appstore®. The content provider may comprise a cloud computing provider.

It will be appreciated that the use of such a generic mobile device in this context may be counter-intuitive to a person skilled in the art—such generic devices are not designed to withstand events such as catastrophic crashes. Furthermore, such generic devices are usually not necessarily configured to appropriately detect conditions that may need to be recorded. Such devices are usually kept in a user's pocket or bag, and so are not best placed to generate sensor data associated with the behaviour of a vehicle. However, the inventor of the present invention has realised that such a mobile device that is adapted for installation to the vehicle can overcome such drawbacks and fulfil a role similar to a black box. To this end, the mobile telecommunication device may comprise an adapter arranged to hold the device securely to the vehicle.

Advantageously, as well as protecting the device from damage, the adapter improves the suitability and reliability of the sensor data and so the driving information associated with when and/or how the vehicle is being driven. For example, if the sensor set comprises an accelerometer, the acceleration of the vehicle can be more accurately measured due to the mobile device being firmly attached to the vehicle. Similarly, if the sensor set comprises an image sensor, for example, for capturing video footage of the road ahead, better footage can be obtained as the mobile device can be held in the correct position and orientation relative to the vehicle. In particular, the mobile device may be positioned by the adapter so that its image sensor views the road ahead through a windshield of the vehicle.

As mentioned, the device is arranged to log driving information associated with the vehicle, when that vehicle is being driven. This is realised by registering the start of the driving period during which the mobile device is installed to the vehicle and the vehicle is being driven by the driver. Advantageously, this prevents driving information from being needlessly recorded. As will be appreciated the mobile device has only a finite storage capacity and so registering the start of the driving period is useful for minimising the unnecessary usage of memory. In particular, where the mobile device comprises an image sensor, and the sensor data comprises a sequence of images (e.g. a video) the storage space can be very quickly filled by the memory.

To this end, it is preferred that when the application is executed, it controls the mobile device to register the start of a driving period in response to an initialisation input. The initialisation input may comprise a user input—for example, the user manually executing the application on the mobile device. The initialisation input may also or instead be generated automatically in response to the mobile device being installed to the vehicle and/or the vehicle being driven. The initialisation input may be generated automatically in response to the sensor data having predetermined values. For example, if the sensor data reflects a detected speed above a predetermined threshold—for example, 20 kilometers per hour—then this can be used to trigger the start of the driving period. Similarly, if the sensor data reflects that the mobile device is held securely to the vehicle in a predetermined position (for example, via the adapter) this can also be used to trigger the start of the driving period. To this end, the adapter and/or the mobile device may comprise a registration module configured to register the installation of the mobile device to the vehicle and/or the adapter. The registration module may comprise a proximity sensor to detect the proximity of the mobile device to the vehicle. The registration module may comprise a NFC (near field communication) device. The registration module may be arranged to determine a match between the location of the mobile device and the location of the vehicle. The match may be performed by receiving and comparing a first positioning input associated with the position of the vehicle and a second positioning input associated with the position of the mobile device. The registration module and/or adapter may be a smart holster.

Preferably, the executed application controls the mobile device to manage voice-calls incoming to the mobile device during a driving period. For example, said voice-call management may comprise temporarily disabling and/or diverting voice-calls incoming to the mobile device during a driving period. Advantageously, this safety feature discourages users from making or receiving phone calls whilst driving. It will be appreciated that a driver is less able to control a vehicle effectively whilst also manipulating a mobile device, and in many countries doing so is illegal. However, the provision of a 'hands-free' mode or accessory—as are well known in the art—may obviate the need for a user to manipulate the mobile device. Accordingly, the executed application may be arranged to control the mobile device to selectively disable and/or divert voice-calls incoming to the mobile device during a driving period, in dependence on the detection of a hands-free accessory or hands-free mode enabled on the mobile device.

Furthermore, the executed application may be arranged to control the mobile device to enable a hands-free mode of operation on detection of a driving period. For example, the enabled hands-free mode of operation may comprise enabling voice-activated commands. In light of this, it is preferred that the adapter is configured to hold the mobile device in a way that facilitates reception of voice commands from the user. In particular, the mobile device may be held in a position relative to the user to permit clear reception of the users voice. Typically, this position is about the dashboard in a vehicle such as car or van. Furthermore, the adapter is configured with an opening through which an audio sensor of the mobile device is able to receive the user's voice.

Also, even though a drivers control of a vehicle may be affected by manipulating the mobile device, under certain circumstances, this may not be objectionable—for example, when the vehicle is stationary. Accordingly, the executed application may be arranged to control the mobile device to selectively disable and/or divert voice-calls incoming to the mobile device during a driving period, in dependence on the driving information—for example, the speed and location of the vehicle.

Furthermore, it will be appreciated that the driver may not be the only user within the vehicle, and so disabling functions of the mobile device may not be appropriate under all circumstances, as a passenger of the vehicle may want to use the mobile device whilst the driver is driving. Under these circumstances, the executed application is arranged to control the mobile device to register the presence of a non-driver (for example, via image recognition, or entry of an unlock code) and unlock, or retain the original functionality of the mobile device. Furthermore, the executed application may be arranged to run in the background. Accordingly, the mobile device may be used for other purposes, such as making or receiving a telephone call.

It is advantageous to store only selected driving information for the purpose of logging how a vehicle is being driven during the driving period. Whilst it may be possible to sample and process sensor data at a relatively high rate (i.e. many times a second), continually storing driving information derived from that sensor data at such a high rate can use up a lot of storage space on the mobile device, the majority of which is likely to be redundant. Therefore, by being selective about the driving information that is stored, storage utilisation can be made more efficient.

In particular, the executed application may control the mobile device to store a summary of the driving period. The summary may comprise compressed and/or summarised driving information. For example, the sensor data can be processed at a first sampling rate and then down-sampled to a fraction of the first sampling rate for storage as driving information. Put another way, the mobile device can be controlled by the executed application to down-sample sensor data from a first sampling rate to a second sampling and store the sensor data as driving information at said second sampling rate. Advantageously, this retains a snapshot of when and/or how the vehicle is being driven, but with fewer data points, and so requiring less storage space.

Nonetheless, under certain circumstances, it is more useful to retain information at higher or the highest possible sampling rates. In particular, it is more important to have detailed information associated with the behaviour of a vehicle during a crash than when the vehicle is being driven normally.

Accordingly, the executed application may be arranged to control the mobile device to detect the occurrence of a predetermined event of significance (such as a crash) and in response store driving information associated with that event to the memory. Preferably, said driving information associated with that event comprises driving information in the lead up to and immediately following the event. In particular, detailed driving information in the lead up to, and immediately following a predetermined event of significance is preferably stored. It will be understood that the driving information associated with the detected event may be transmitted via the wireless telecommunication module in addition to, or instead of storing said data. Said transmitted driving information may be transmitted to a remote data logging system.

To this end the mobile device may comprise an event detector for detecting the occurrence of an event.

Preferably, the event detector is arranged to detect the occurrence of a predetermined event by correlating data, such as sensor data, against an event indication model. The application may comprise the event indication model.

Preferably, the event indication model comprises a set of predetermined data values corresponding to a predetermined event. Accordingly, the event detector is arranged to compare the set of predetermined data values against corresponding sensor data to determine whether the predetermined event has occurred.

For example, the event indication model may indicate that a serious crash has occurred if values returned by an accelerometer sensor exceed predetermined data values of the event indication model, thereby representing a sustained vehicle deceleration beyond a threshold level. Following on from this, it will be appreciated that detection of an event may be dependent on matching a sequence of data values that have occurred over time. Moreover, the event indication model may comprise a sequence of predetermined data values, the sequence being associated by a function of time. Thus, the event detector may be arranged to compare the sequence of predetermined data values against corresponding sensor data that have been generated over a given time period. Put another way, the event detector and event indication model are arranged to indicate the occurrence of an event in dependence on the correlation between a set of predetermined data values occurring over time. Thus, a set of values returned from sensor data over a period of time are compared against a corresponding sequence of predetermined data values of the event indication model. Typically, this is to determine a rate of change of variables associated with a sensor set.

It will be understood that an event indication model may comprise a plurality of sets of predetermined data values, each set corresponding to different sensor data. For example, an event indication model associated with a serious accident event may contain data values corresponding to both the deceleration of the vehicle, and the orientation of the vehicle. Thus, if a vehicle is involved in a serious impact, and overturns, this is represented by the model, and so can be detected by the event detector.

Preferably, the event indication model comprises a pattern of predetermined data values. Preferably, the event detector is arranged to detect the occurrence of an event by carrying out pattern recognition by matching sensor data values to the pattern of predetermined data values of the event indication model. Preferably, there are a plurality of event indication models. Each event indication model may be associated with a separate predetermined event.

Preferably, the executed application may be arranged to control the mobile device to process sensor data from the sensor set during a plurality of driving periods to derive driving information associated with when and/or how the vehicle is driven for each of the driving periods. Preferably, sensor data processed during a first set of driving periods define a benchmark against which sensor data is compared during subsequent sets of driving periods. In particular, the executed application may be arranged to control the mobile to modify one or more event indication models in response to the benchmark. Advantageously, such a benchmark ensures that the event indication models may be tailored to the standard behaviour of a particular vehicle. As will be appreciated, different sensor types, mobile devices, mounting positions, vehicles, drivers and road conditions may generate different sets of sensor data for driving behaviour that is considered standard or safe. Accordingly, the benchmark allows the mobile device to account for variable driving conditions.

Preferably, a plurality of benchmarks may be defined. A benchmark may be defined for each driver. A benchmark may be defined for each vehicle to which the mobile device is to be installed. Ideally, a benchmark is defined for each driver-vehicle pair. To this end, the mobile device may be arranged to receive an input to specify a driver, a vehicle or a driver-vehicle pair. Advantageously, this ensures that different drivers and vehicles do not disrupt the accurate event detecting capabilities of the event detector.

Once a predetermined event has been detected by the event detector, it is desirable to take an appropriate action in response to that detected event. Accordingly, the executed application may be arranged to control the mobile device to take at least one predetermined action in response to a detected event. The action taken may comprise transmitting driving information and/or sensor data, via the wireless telecommunication module of the mobile device, to a remote system. Advantageously, this enables a remote system to be notified of the occurrence of a particular event, and the details associated with that event. For example, the remote system may be arranged to deploy emergency services based on a transmitted notification concerning the occurrence of a crash, and also the location of the mobile device (and so the vehicle) are also included in the transmitted information. A further advantage of transmitting driving information and/or sensor data to a remote system is that such data then does not need to be stored on or processed by the mobile device. Thus, this can free the storage space on the mobile device, and also allow the processor of the mobile device to carry out other tasks. A remote system may comprise or be interfaced with an insurance company database.

A further advantage associated with sending driving information to a remote system is that the driving information can be assessed remotely. This assessment can be performed automatically or manually—either way it advantageously removes the processing burden from the mobile device. Alternatively, if transmission bandwidths are small, the processing can be executed automatically on the processing device. In this case, the use of virtual neural networks can be used to determine whether the driving information represents acceptable or unacceptable driving patterns.

The action taken may comprise storing data captured at a higher (or the highest possible) sampling rate than when an event is not detected. Thus, as described above, this may involve preventing the down-sampling of sensor data. Furthermore, the action taken may comprise protecting said driving information from being overwritten.

The action taken may comprise providing feedback to a user to indicate that an event has been detected. Preferably, the mobile device is configured to receive a user interaction to confirm or deny whether the detected event has actually occurred following said feedback. Advantageously, such user feedback can be used to modify event indication models thereby to refine the effectiveness of the event detector. The mobile device may comprise a speaker. Accordingly, such feedback may be provided via an audio prompt. The mobile device may comprise a display screen. Accordingly, such feedback may be provided via a visual prompt. The feedback may comprise notifying a user that a further action has been scheduled, and will be taken within a predetermined period. For example, the feedback may indicate to a user that an event such as a serious crash has been detected, and so the next action to be taken will be to contact emergency services within 10 seconds. Preferably, the feedback includes a prompt to receive a user input. For example, the prompt may be arranged to receive a user input to cancel a subsequently scheduled action. Advantageously, this prevents actions being taken needlessly as a result of an incorrect determination of an event.

The feedback may provide reassurance and/or guidance to a user. For example, a user may be provided with an important checklist of things to do following an accident or incident. For example, the user may be guided to use a camera (image sensor) on the mobile device to take photographs of the vehicles involved in the incident, including the number plates of those vehicles. The user may be guided to use a text input device on the mobile device to note the name, address, insurance details etc of third parties involved in incident.

The action taken may comprise communicating to a remote system associated with an insurance company that an incident has been detected (e.g. via a low bandwidth data connection or via text message). If appropriate—or in response to a request from a communication to the mobile device from the remote system—the action taken may comprise transmitting all or selected portions of the driving information associated with the detected event.

Preferably, the executed application is arranged to control the mobile device to prioritise essential communications, such as calls to the emergency services.

Preferably, the memory comprises a long term memory for persistently storing driving information and/or sensor data. Preferably the memory comprises a buffer. The buffer may comprise a short term memory for transiently storing driving information and/or sensor data. Preferably, the short term memory is arranged to receive driving information and/or sensor data at a higher update rate than the long term memory. Preferably, the long term memory has a larger capacity than the short term memory.

Preferably, the executed application controls the mobile device to write driving information and/or sensor data to the short term memory at a predetermined update rate during the driving period. Ideally, the driving information and/or sensor data is written to the short term memory in a predetermined sequence, ideally a chronological sequence. Preferably, the executed application controls the mobile device to overwrite driving information and/or sensor data previously written to the short term memory. Advantageously, this ensures that recording of sensor data and/or driving information, especially data that is recorded at a relatively high update rate, is not prevented during the driving period due to the short term memory becoming full.

Preferably, the driving information and/or sensor data is overwritten in accordance with the predetermined sequence. Advantageously, this can ensure that the most relevant, up-to-date data is retained in the short term memory.

Preferably, the action taken in response to a detected event comprises transferring data from the short term memory to the long term memory. Advantageously, this can ensure that the most recent information associated with an event is persistently stored in the long term memory, and is not overwritten.

Preferably, the sensor set comprises an accelerometer for detecting the acceleration of the mobile device. Accordingly, the corresponding sensor data may comprise acceleration data generated by the accelerometer. The accelerometer may be a single axis or dual axis accelerometer. However, it is preferable that the accelerometer is a three-axis accelerometer so that movement of the vehicle may be determined in three-dimensional space. Furthermore, as the mobile device may be mounted by a user in one of a number of different orientations relative to the vehicle, a three-axis accelerometer ensures that acceleration along the axis aligned with the general forward movement of the vehicle may be effectively detected. This is particularly important to determine an event such as heavy braking of the vehicle and/or a crash.

Preferably, the sensor set comprises an image sensor such as a camera. Accordingly, the corresponding sensor data may comprise images and/or a sequence of images generated from the image sensor. Said sequence of images may be processed and/or stored in the form of a video. Advantageously, this can improve the space utilisation of the sequence of images. Preferably, the mobile device is arranged to receive a user input to store a user-selected image or sequence of images to the memory. The image sensor data may be processed to determine safety information and feedback said safety information to the driver. For example, the mobile device may be controlled to determine the proximity of the mobile device to other vehicles. Said determination may be via comparing the apparent size of the number plate of other vehicles in an image with a known size of a standard number-plate, and from that the distance to those other vehicles. Thus, the mobile device can make a determination that another vehicle is too close, and issue a warning to the driver to slow down to avoid a collision. Similarly, images of the road ahead may be processed to determine whether a vehicle is drifting out of lane (e.g. because the driver is falling asleep). In response to such a determination, an alert can be issued. Similarly, images of road signs may be processed to assess driver behaviour.

It will be appreciated that the mobile device may comprise a plurality of image sensors. For example, the mobile device may have a forward-facing camera and a rear-facing camera. Accordingly, it may be possible to view images of the road ahead, external to the vehicle, and also from inside the vehicle. In particular, the mobile device may be arranged to capture images or a sequence of images of the driver. Images of the driver may be processed to make a safety determination. For example, the images may be processed to detect whether the driver is falling asleep. In particular, a blink rate of the driver may be detected by processing the image data. Similarly, a determination may be made whether the driver has their eyes closed. In response to such a determination that a driver is falling asleep, the mobile device may be arranged to issue an alert so as to wake the driver.

Preferably, the sensor set comprises an audio sensor such as a microphone. Accordingly, the corresponding sensor data may comprise audio data.

Advantageously, an image sensor and/or an audio sensor can provide an important record of an event such as a crash.

Preferably, the sensor set comprises a positioning module arranged to determine the position of the mobile device. The positioning module may comprise a GPS module. The positioning module may be arranged to utilise the wireless telecommunication module to self-localise, for example by determining a position relative to one or more mobile telecommunication cell towers. Advantageously, the positioning module can allow the mobile device to determine its position (and so the position of the vehicle) over time. Accordingly, the positioning module can thus determine the speed of the mobile device and vehicle. Thus, the corresponding sensor data may comprise latitude, longitude, elevation, speed and other data obtainable from positioning modules such as GPS modules as is known in the art.

Preferably, the sensor set comprises an orientation sensor for determining the orientation of the mobile device. Said orientation sensor may comprise an electronic compass for determining a bearing, and so the direction in which the mobile device is facing. Accordingly, the corresponding sensor data may comprise orientation and bearing data. Advantageously, such data can be used to augment the data of the positioning module. Furthermore, the executed application may be arranged to use the data from the orientation sensor to determine whether the mobile device has been fitted to vehicle, and whether the mobile device has been fitted in the correct orientation. Advantageously, the data from the orientation sensor may also be used to determine whether a significant event has occurred, such as the vehicle overturning.

Preferably, the sensor set comprises a user-input device arranged to receive an input from a user. The user input device may comprise at least one of buttons and a touch-sensitive display screen. Advantageously, this allows a user to input data to the mobile device.

Preferably, the mobile device comprises a timer. Preferably, the executed application is arranged to control the mobile device to record sensor data and/or driving information against time as determined by the timer. Accordingly, the timer can be used to time-synchronise sensor data and/or driving information.

Preferably, the executed application is arranged to encrypt the driving information stored on the memory. Advantageously, this reduces the possibility of said driving information being modified without authorisation. This is an important consideration when such driving data may be used as evidence, for example, when determining the cause of an accident.

Preferably, the mobile device is arranged to interface with an external device to receive external driving information from said external device. It will be appreciated that the sensor set onboard the mobile device may be supplemented by a sensor set external to the mobile device. For example, the external device may be an engine management system of the vehicle and/or the external device may be arranged to connect to the on-car data network of the vehicle. Thus, the external device may have access to information associated with the behaviour of the vehicle (for example, the speed of the vehicle, how much the brake pedal is being pressed, etc).

Such driving information can be processed and/or stored by the mobile device under control of the executed application in a manner similar to driving information derived from sensor data internal to the mobile device.

Preferably, the mobile device is arranged to interface with an external device wirelessly, for example via a Bluetooth® connection. Advantageously, this removes the need for the mobile device to be physically connected to the external device. As will be appreciated, following a driving period, a user may want to leave the vehicle and so take a personal mobile telecommunication device with them, and so a wireless interface with such an external device obviates the inconvenience of physically detaching and then subsequently re-attaching the mobile device.

Preferably, the mobile device is further controlled by the application to determine a unique identifier associated with the mobile device and retrieve from the memory and transmit via the wireless telecommunication module to a remote system said driving information paired with said unique identifier.

Advantageously, by pairing an identifier uniquely associated with the mobile device enables the remote system to unambiguously determine the source of the driving information. Accordingly, said driving information can be matched to a particular driver and/or vehicle. This is particularly useful when assessing a risk profile of said driver.

Preferably, the mobile device is controlled by the executed application to process the driving information to generate a driving score. The driving information may comprise the driving score.

Preferably, the mobile device comprises a display screen. Preferably, the display screen is touch-sensitive. Advantageously, the display screen may thereby be user-interactable. Preferably, the mobile device comprises a graphical user interface (GUI). The graphical user interface comprise user-interactable artefacts such as buttons. Preferably, the user-interactable artefacts may be displayed on the screen and receive a user input for selection or control of those artefacts. The mobile device may be controlled to selectively hide those artefacts in dependence on the state of the mobile device.

Preferably, the mobile device is controlled by the application to provide feedback about the driving information and/or values of the sensor data. Ideally, such feedback is via the display screen. For example, a detected speed may be displayed, a time elapsed may be displayed, a bearing/heading may be displayed, a detected position may be displayed and/or a detected image or sequence of images may be displayed (e.g. via a video feed).

According to a second aspect of the present invention there is provided a mobile telecommunications device adapted for installation to a vehicle and configured to log driving information associated with the vehicle when driven, the mobile device comprising: a sensor set comprising at least one of an image sensor, an audio sensor, an accelerometer and a positioning module; a processor for processing sensor data from at least the sensor set to derive said driving information; a memory for storing said derived driving information; a wireless telecommunications module operable to download a controlling application; and a registration means for registering the start of a driving period during which the mobile device is installed to the vehicle and the vehicle is being driven by a driver; wherein, the processor is arranged to process sensor data from the sensor set during the driving period to derive driving information associated with when and/or how the vehicle is driven and store a selection of the driving information to the memory.

According to a third aspect of the present invention there is provided a mobile telecommunications device adapted for installation to a vehicle and configured to log driving information associated with the vehicle when driven, the mobile device comprising: a sensor interface arranged to receive sensor data from a sensor set; a processor for processing the sensor data to derive said driving information; a memory for storing said derived driving information; a wireless telecommunications module operable to download a controlling application; and a registration means for registering the start of a driving period during which the mobile device is installed to the vehicle and the vehicle is being driven by a driver; wherein, the processor is arranged to process sensor data from the sensor set during the driving period to derive driving information associated with when and/or how the vehicle is driven and store a selection of the driving information to the memory.

Preferably, the sensor interface is arranged to receive sensor data from a sensor set external to the mobile device. Preferably, the sensor interface is arranged to interface with an external device as described in relation to the first aspect of the present invention. Advantageously, this enables a mobile device to utilise a richer or better equipped sensor set than that local to the mobile device.

According to a fourth aspect of the present invention there is provided a mobile device adapted for installation to a vehicle and configured to log driving information associated with the vehicle when driven. Preferably, the mobile device comprises a sensor interface arranged to receive sensor data from an external sensor set. The mobile device may comprise an internal sensor set. Preferably, the mobile device comprises a processor for processing the sensor data to derive said driving information. Preferably, the mobile device comprises a memory for storing said derived driving information. Preferably, the mobile device is a mobile telecommunication device, comprising a wireless telecommunications module. Preferably, the wireless telecommunications module is operable to download an application. Preferably, the mobile device comprises a registration means for registering the start of a driving period during which the mobile device is installed to the vehicle and the vehicle is being driven by a driver. Preferably, the processor is arranged to process sensor data from the sensor set during the driving period to derive driving information associated with when and/or how the vehicle is driven. Preferably, the mobile device is arranged to store a selection of the driving information to the memory. Preferably, the mobile device is arranged to transmit a selection of the driving information via the wireless telecommunication module. The mobile device may be arranged to transmit a selection of the driving information via the wireless telecommunication module to a remote system such as a remote data-logging system. Advantageously, transmitting (rather than storing) selected driving information prevents storage space local to the mobile device being used up.

According to a fifth aspect of the present invention there is provided a method of logging driving information associated with a vehicle when driven, the method comprising: adapting and installing a mobile device to the vehicle, the mobile device comprising a memory; registering the start of a driving period during which the mobile device is installed to the vehicle and the vehicle is being driven by a driver; processing sensor data from a sensor set during the driving period to derive driving information associated with when and/or how the vehicle is driven; and storing a selection of the driving information to the memory of the mobile device.

According to a sixth aspect of the present invention there is provided a data-logging system for logging driving information comprising: a database for storing a plurality of accounts, each account having a unique identifier and the database being arranged to store driving information associated with at least one of a vehicle and a driver; a communications interface arranged to communicate with a remote mobile device, and receive therefrom: a unique identifier for association of the mobile device with a corresponding one of the plurality of accounts; and driving information to be logged to that corresponding account.

The remote mobile device may be a mobile device in accordance with one of the first to fourth aspects of the present invention.

Preferably, the driving information comprises a driving score. Preferably, the driving information comprises sensor data captured and processed by the mobile device during a driving period during which the mobile device is installed to a vehicle being driven by a driver.

Preferably, the system is arranged to process the driving information logged to the corresponding account to generate a driving score. The driving score may be used to determine a risk profile for at least one of the vehicle and driver. The driving score may be used to define an insurance premium associated with the account.

Preferably, the system is further arranged to communicate to a mobile device an insurance offer generated in response to the driving information received from the mobile device. The data logging system may be further arranged to receive from the mobile device a user-acceptance of the insurance offer.

The mobile device may be arranged to generate an insurance offer in response to a predetermined set of conditions being met. For example, driving information over a plurality of driving period adhering to predetermined models. Such models may comprise safe driving parameters and/or thresholds.

For brevity, it will be understood that features, functions and advantages of different aspects of the present invention may be combined or substituted where context allows. For example, features, functions or advantages of the mobile device described in relation to the first to fourth aspects of the present invention may be provided as method steps in the method of logging driving information according to the fifth aspect of the present invention.

BRIEF DESCRIPTION OF THE DRAWINGS

In order that the invention may be more readily understood, reference will now be made, by way of example, to the accompanying drawings in which:

FIGS. 5 to 24 illustrate a graphical user interface of the mobile device according to FIGS. 1 to 4b.

DETAILED DESCRIPTION OF THE EMBODIMENTS

Specific embodiments are now described with reference to the appended figures.

A preferred embodiment of the present invention relates to a mobile telecommunications device for recording events associated with a vehicle, such as a car. In particular, the mobile telecommunications device is loaded with an application—a 'mobile app'—which is arranged to record and document the events surrounding an incident involving the vehicle (a 'driving incident'), such as a vehicle collision. The mobile application may be referred to as the 'Witness' application in the ensuing description.

Figure 1:
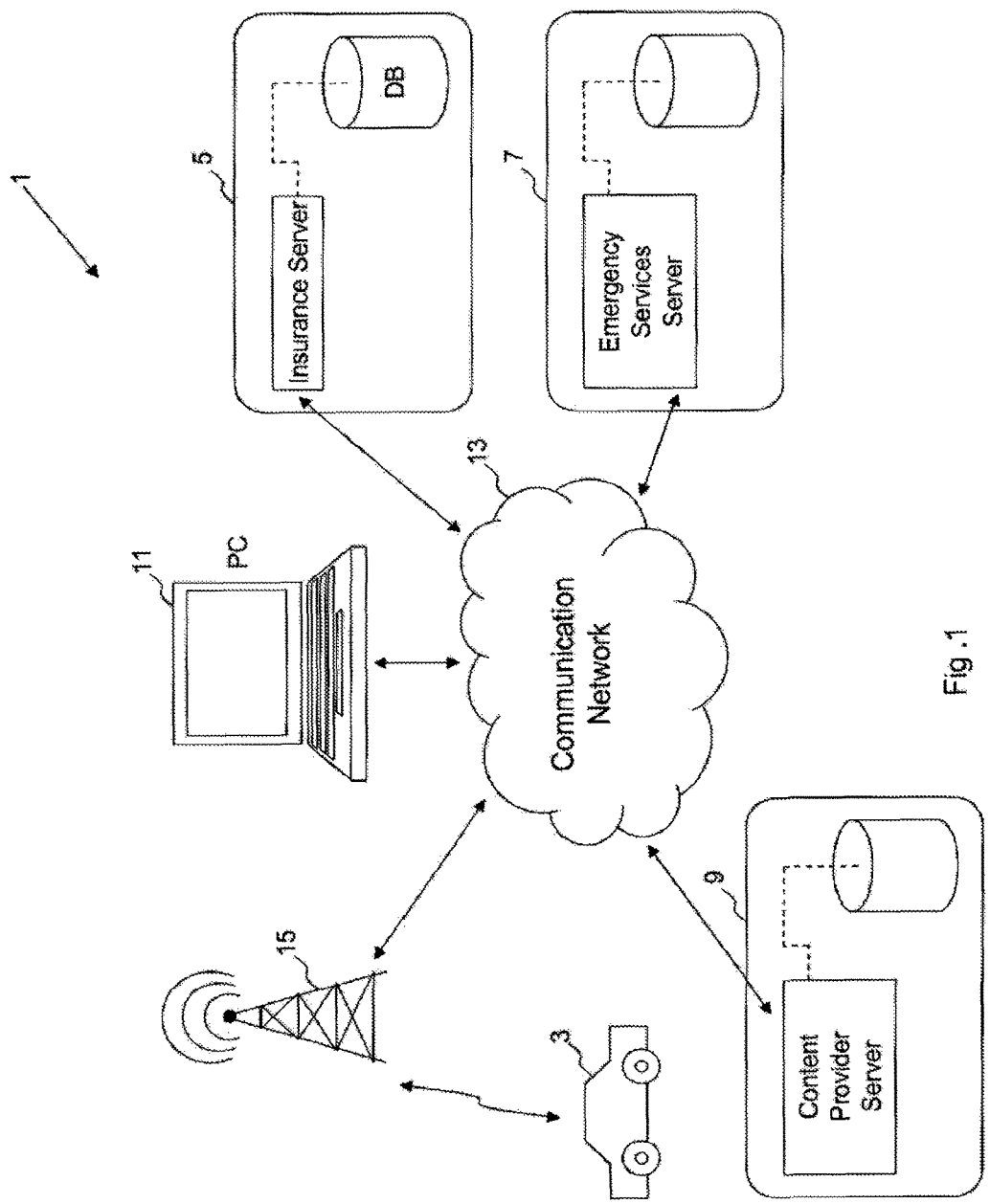
FIG. 1 is a schematic illustration of a system within which the mobile device of various embodiments of the present invention may be used.

FIG. 1 illustrates a system 1 within which a vehicle, such as an automobile 3 configured with a mobile telecommunications device executing the Witness application, may communicate with one or more remotely located devices or systems. Such devices may relate to one or more servers, such as an insurance server 5, an emergency services server 7, a content provider server 9, and a personal computer 11. Communication between the automobile 3 and the one or more remotely located devices 5, 7, 9, 11 may be effected via a shared communication network 13. The shared communication network may relate to a wide area network (WAN) such as the Internet, and may also comprise telecommunications networks. For example, the mobile telecommunications device of the present embodiments may be arranged to communicate with any one of the remotely located devices 5, 7, 9, 11 via a mobile telecommunications base station 15, which is coupled to the shared mobile telecommunications network 13.

A main purpose of the mobile telecommunications device, when arranged within a vehicle in motion, such as the illustrated automobile 3, is to monitor and process sensor data captured by the mobile device, to derive driving information associated with the moving automobile 3. As mentioned previously, this driving information is subsequently used by the mobile device to determine if a driving incident or event has occurred. The term "driving incident" as used within the present context may relate to an event such as a collision, a near-miss, dangerous driving, erratic driving or similar. Similarly, the driving information may be used as a means for monitoring a driver's driving performance, and determining a driving characteristic, or user profile for the subject driver. In other words, the sensor data and/or the driving information may be used to determine for example, if the driver is a cautious driver, or a reckless driver. This information may be used, for example by an insurance provider, to conduct a risk assessment and to tailor an insurance premium to the subject driver on the basis of a determined driving characteristic. Further details of this alternative embodiment are described below.

The mobile telecommunication device's functionality is provided by the Witness application, which is installed in the device's local non-volatile storage, and which is executed by the device's native processor. The application may be downloaded to the mobile device via the shared communications network 13 and telephone base station 15, from the content provider server 9.

In use (once the application has been configured for execution on the mobile telecommunications device), when a driving incident has been detected by the mobile telecommunications device, data, comprising one or more of mobile device sensor data, derived driving information, and captured image data may be automatically forwarded to one or more of the remotely located devices 5, 7, 9, 11. For example, the mobile device may be configured such that when a driving incident is detected, such as a collision involving an automobile 3, driving information (including image data captured by the mobile device) derived from the sensor data is automatically forwarded to the insurance server 5, via the base station 15 and shared communications network 13. In this way, data relating to the driving incident (a collision in this example), is automatically forwarded to the automobile user's insurance provider, for use in claim settlement, and/or to determine culpability.

Similarly, once a driving incident has been detected, data may also be automatically forwarded to the emergency services server 7. For example, such data may comprise the position information of the automobile 3, along with an automated S.O.S. message requesting assistance from the emergency services. Forwarded data may also comprise sensor data, and any relevant derived driving information, such as speed of impact, the g-forces the vehicle was subjected to during the collision, or any other information wherefrom the severity of the collision may be determined, and which may be used to assist the emergency services in coordinating the appropriate level of response.

Optionally, an electronic message may be sent to a personal contact preselected by the user. For example, an automated message, such as an e-mail, may be forwarded to the PC 11 of the user nominated personal contact, informing the personal contact that the user of the vehicle 3 has been involved in a driving incident. Similarly, and due to the mobile device's telecommunications functionality, an electronic text message, such as an SMS (Short Message Service) may be forwarded to the telephone of the user selected personal contact, informing the contact of the driving incident. The mobile device may be equally be arranged to communicate with a personal contact via any known electronic messaging service and/or instant messaging service too. For example, via Apple's® iMessage, or RIM's® BlackBerry Messenger (BBM) service.

This functionality of forwarding a message to a nominated contact, may also be of particular benefit for managing large fleets of vehicles. For example, a car hire service. In this way, if any of the vehicles comprised in the fleet are involved in a driving incident, the car hire service may be automatically notified of the identity of the specific vehicle involved in the driving incident. In such embodiments, the nominated personal contact would be preselected by the vehicle fleet manager. The option of providing a second user selected personal contact is also envisaged. In this way, a message may be forwarded to both the car hire service for example, and to the driver's selected personal contact.

In preferred embodiments the mobile telecommunications device relates to a mobile telephone having native processing functionality, and preferably relates to a smartphone. Preferably, the mobile telephone comprises a camera arranged to enable image capture, and preferably arranged to enable a sequence of images to be captured taken in temporal succession. In other words, in preferred embodiments the mobile telephone comprises a camera configured to enable video footage of a sequence of events to be captured.

Alternatively, the mobile telecommunications device may relate to a PDA, a notepad such as an iPad®, or any other mobile device comprising local processing means and means for communicating with a telecommunications network.

Figure 2:
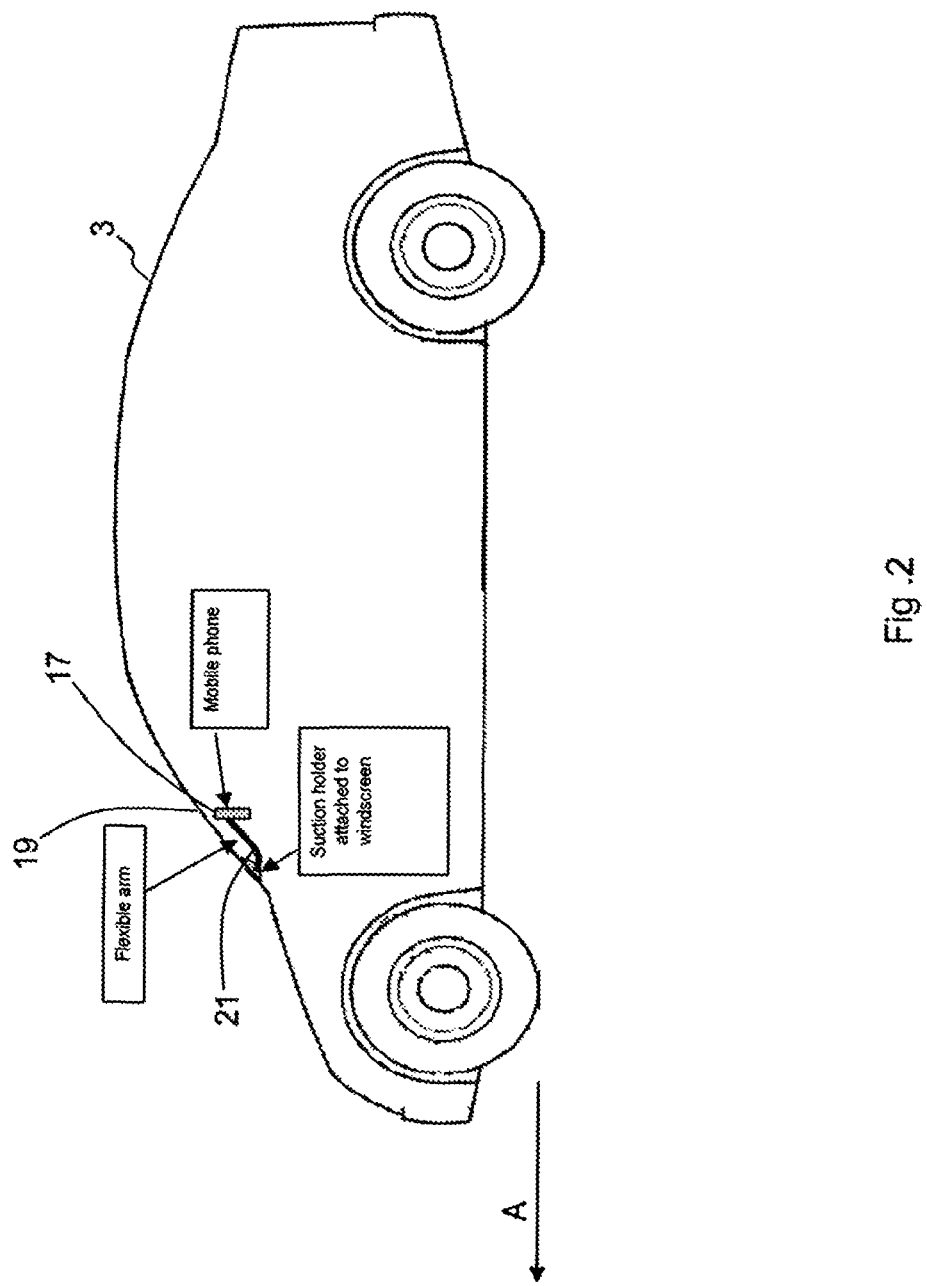
FIG. 2 is an illustration of the automobile of FIG. 1 configured with a mobile device in accordance various embodiments of the present invention.

FIG. 2 provides a more detailed view of the automobile 3 of FIG. 1, and illustrates a preferred arrangement of the mobile telecommunications device 17 within the automobile 3. In the illustrated embodiment, the mobile telecommunications device 17 relates to a smartphone configured with an image capture device, such as a camera. Preferably, the device 17 is arranged within the vehicle, such that the camera has a clear line of sight of the road in the principle direction of travel of the automobile 3. For example, the device 17 may be attached to the windshield 19 of the automobile 3 in an adapter 21. The adapter 21 may comprise a flexible telescopic arm, configured with a suction cup at one end for affixing the adapter to the windshield 19, and a dock arranged at the opposite end for securely holding the telecommunications device 17 in place. The telescopic arm enables the position of the device 17 to be varied, such that a clear line of sight in the direction of travel may be obtained.

The details of the adapter 21 are irrelevant for present purposes, with the exception that it must enable a clear line of sight in the principle direction of travel of the vehicle to be obtained, and it must firmly affix the mobile to the vehicle. Affixing the mobile telecommunications device 17 to the automobile 3, ensures that the mobile device 17 is able to accurately capture the automobile's state of motion. By principle direction of travel is intended the main direction of travel of the vehicle when operated in a conventional way, indicated by the arrow A in FIG. 2. In other words, the forward direction of travel. The skilled reader will appreciate that whilst most vehicles, such as an automobile, may have more than one direction of travel (e.g. travelling backwards when in reverse gear), the majority of vehicles have a primary direction of travel, which is the intended direction of travel for any transit of substantial length and/or distance. Arranging the telecommunications device 17 relative to the direction of principal travel, ensures that the camera (not shown) of the telecommunications device 17 is well placed to capture any image data which may be pertinent to a subsequently detected driving incident, such as a collision.

Figure 3:
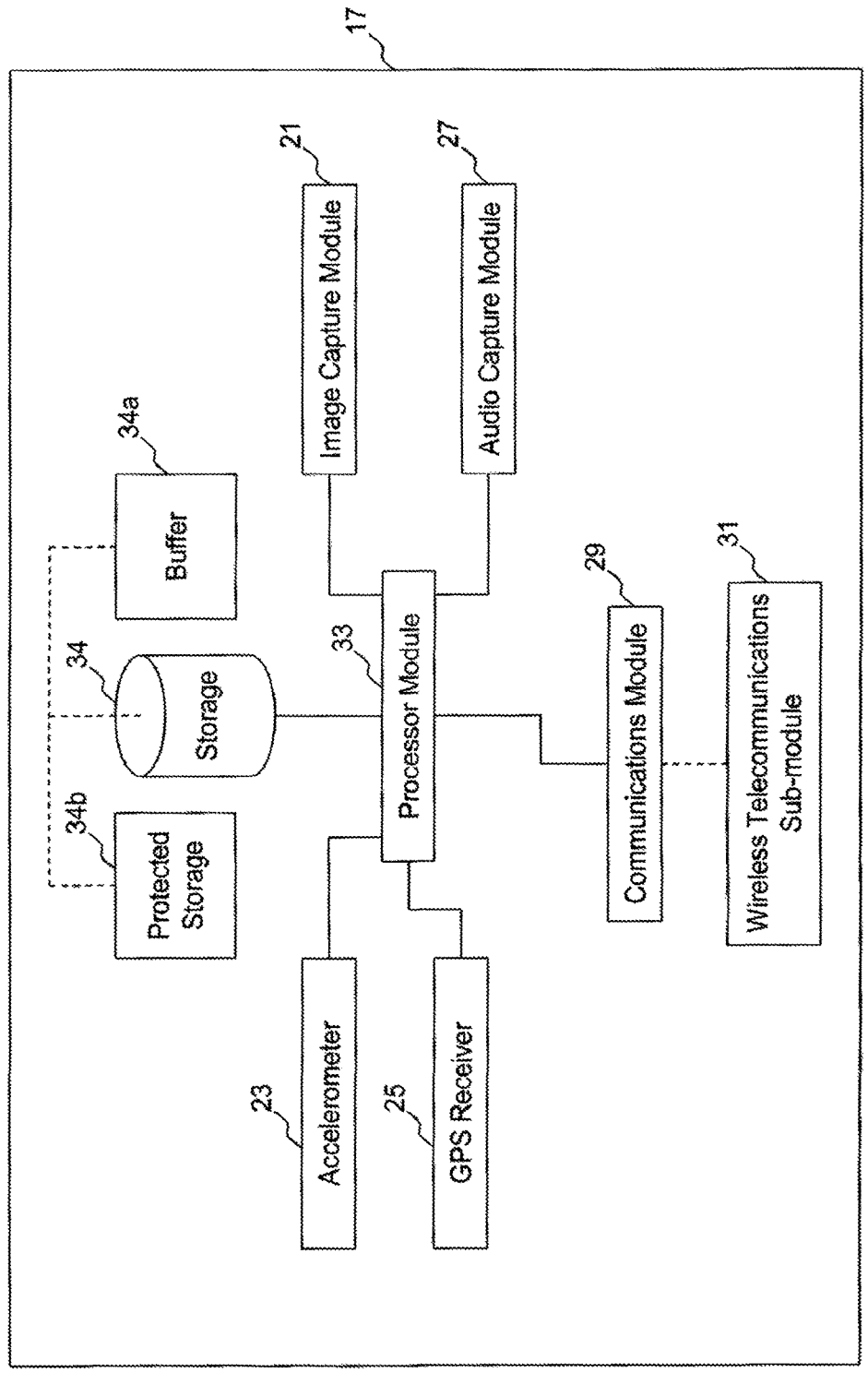
FIG. 3 is a schematic illustration of the functional components of the mobile device of FIG. 2.

FIG. 3 is a schematic of the modular components of the mobile telecommunications device 17 of FIG. 2. Preferably the mobile telecommunications device 17 comprises: an image capture module 21, an accelerometer 23, a GPS receiver 25, an audio capture module 27, a communications module 29, a processor module 31 and a storage module 33. The image capture module 21, accelerometer 23, GPS receiver 25, and audio capture module 27 form a sensor set and are generically referred to as data capture modules in the ensuing description, and are differentiated from the communications module 29, processor module 31 and storage module 33, in that they comprise sensors for sampling physical data.

This sampled physical data, which is also referred to as sensor data, is subsequently processed by the processor module 31 and stored in the storage module 33.

The image capture module 21 may relate to any image capture device, such as an integrated camera commonly found in smartphones or similar mobile devices. As mentioned previously, the image capture module 21 is preferably configured to capture a plurality of images taken in temporal succession, such as provided by a video camera.

The accelerometer 23 is arranged to provide information regarding the motion of the automobile 3 along all three dimensional axes. For example, the accelerometer 23 provides information regarding the pitch, yaw and roll of the automobile 3. Sensor data captured from the accelerometer 23 may be used to determine the g-forces the automobile has been subjected to. This is particularly useful in determining the severity of a collision. In general, the greater the g-forces experienced in a collision, the greater the risk of serious injury to the passengers of the vehicle. This information may assist the emergency services in forming an initial assessment of the severity of a collision. Furthermore, this type of data may also assist the emergency services and/or insurance provider to obtain a better understanding of the driving incident. For example, in the event of a collision, this data may assist the emergency services and/or insurance provider to obtain a better understanding of how the collision occurred. This information may subsequently be used for dispute resolution, and/or for determining culpability.

The GPS receiver 25 is arranged to provide location information, such as positional coordinates, and can also provide velocity information. When combined with the accelerometer sensor data, the GPS receiver data can be used to provide a very accurate model of a driving incident, such as a collision. In particular, the GPS sensor data provides velocity data, such as the velocity of impact. The velocity data enables one to determine if a vehicle was being driven at speeds greater than the legally permitted maximum speeds.

The audio capture module 27 provides means, such as a microphone, for recording audio data, which might be generated by a driving incident. This includes any sounds generated externally to the vehicle, for example the sound of an impact, or the sound of the crumple zone being crushed. Additionally, sounds generated internally to the vehicle are also recorded. Such audio data may also help to recreate a driving incident, and understanding the causes of the incident.

The communication module 29 provides the mobile telecommunications device 17 with functionality for communicating with the remotely located devices 5, 7, 9, 11 of FIG. 1. The communication module 29 comprises a wireless telecommunications sub-module 31 enabling communication over a telecommunications network. An optional wi-fi communication sub-module is also envisaged. Similarly, the presence of wired communication modules are also envisaged, such as a USB port and/or an IEEE 1394 interface (more commonly known as FireWire™) to support wired communication with a remote device, such as a personal computer or similar. Such a connection may be useful for the purposes of side-loading the application to the mobile device.

As mentioned previously, sensor data captured from any one of the aforementioned data capture modules 21, 23, 25, 27 is processed by the processor module 33, to generate driving information. By driving information is intended any data which may be derived from raw sensor data captured by any one of the aforementioned modules 21, 23, 25, 27. For example, g-force data is driving information which is derived from the sensor data sampled by the accelerometer 23. The skilled reader will be familiar with the plurality of types of driving information that may be derived from sensor data sampled by the aforementioned modules, and accordingly a complete list of the different types of driving information that may be derived from sampled sensor data is omitted for brevity.

The processor module 33 is also configured to analyse sampled sensor data and generated driving information to determine if a driving incident has occurred (described in more detail below).

Sampled sensor data is stored in storage 34, which is operatively coupled to the processor module 33, along with any generated driving information. The storage 34 is preferably configured with a FIFO (First In First Out) storage buffer 34a, and a permanent storage component 34b. In preferred embodiments, the data capture modules are configured to sample data at periodic intervals. Preferably, these intervals are sufficiently small, of the order of milliseconds, such that for practical purposes the data capture modules may be considered to sample data continuously. The sampled data, along with any derived driving information is preferably stored in the storage buffer 34a, unless a driving incident has been identified, in which case the associated sensor data and driving information is stored in the permanent storage component 34b to avoid undesirable overwriting.

In preferred embodiments, the FIFO storage buffer 34a is provided with a finite amount of storage space. Nonetheless, said storage space may be predefined by the user as will be described below. In any case, once this storage space has been exhausted, the oldest recorded data is overwritten by newly sampled data, and this cycle of overwriting older data with newly sampled data is continuously carried out during operation of the telecommunications device 17, unless a driving incident has been detected, in which case, and as mentioned previously, all data related to the driving incident is stored in a long term protected storage 34b to safeguard it from being overwritten by newer data.

In preferred embodiments, the mobile telecommunications device 17 may be configured with a data recording strategy by the user. This might define the frequency with which sensor data is sampled. In other words, how many measurements are made per unit of time. Furthermore, the recording strategy also defines how data is recorded. In preferred embodiments, sampled sensor data is stored in data files in the buffer 34a. Each data file represents a plurality of sequentially sampled sensor data, captured over a defined period of time, which will be referred to as a 'data file period'. This is best illustrated by considering captured image data, such as video footage. A video period may be defined, which period defines the unit of physical time covered by captured video footage comprised in a single video data file—this is the data file period for image data. The video data file is subsequently stored in the buffer 34a. For example, a five minute video period setting, instructs the processor 33 to store all sequentially captured image data captured by the image capture module 21 over a period of five minutes, in a separate video data file. It is to be understood that whilst the image capture module 21 is continuously sampling image data (in other words, it is continuously capturing image data), this plurality of captured image data is grouped together for storage in video data files, each data file representing a five minute data file period.

Sampled sensor data and derived driving information is also continuously analysed by the processor module 33 for the purposes of detecting a driving incident. As soon as a driving incident is identified, the associated sensor data and derived driving information is stored in a data file in accordance with the data recording strategy. Returning to the example described in the preceding paragraph, this entails combining the video footage captured within a temporal window of five minutes leading up to the detected driving incident, in a single video file, and storing this data file in protected storage 34b. Whilst each different type of sensor data may be recorded in separate data files, in preferred embodiments all the different types of sensor data sampled by the mobile telecommunications device 17 are stored together in a single data file in accordance with the user selected data recording strategy. This means that the five minute data file referred to above, preferably also comprises GPS data, accelerometer data, and audio data sampled over the five minute time period.

Data files are stored in the buffer 34a, unless they are associated with a driving incident, in which case they are then stored in protected storage 34b, which cannot be overwritten. Once the storage space comprised in the buffer 34a has been exhausted, the oldest data file is overwritten by a newer data file.

Data compression methods may also be used in conjunction with the present invention to improve the use of storage. For example, data comprised in data files which have not been associated with a driving incident may be compressed using compression techniques, which techniques will be known to the skilled reader. Similarly, within a data file associated with a driving incident, sensor data captured at time coordinates which are distant from the determined driving incident may be compressed. In this way, the resolution of sensor data which is directly pertinent to a driving incident is maintained, whilst sensor data which may be less relevant to the driving incident is maintained at a lower resolution.

Since the sensors of the mobile telecommunications device 17 are continuously recording sensor data, even when a driving incident is detected, the device 17 may be configured to comprise sensor data and/or driving information recorded/derived shortly after the driving incident in the same data file, since this data may also be relevant for understanding a driving incident. Furthermore, this also enables the mobile telecommunications device to record multiple driving incidents. For example, a multiple collision.

The processor module 33 may be configured with encryption means, enabling stored data files to be encrypted to prevent data tampering. Envisaged encryption means may comprise both software solutions and hardware solutions. For example the processor module may comprise a cryptoprocessor, or the processor may be configured with code to carry out a cryptographic process.

Figure 4A:
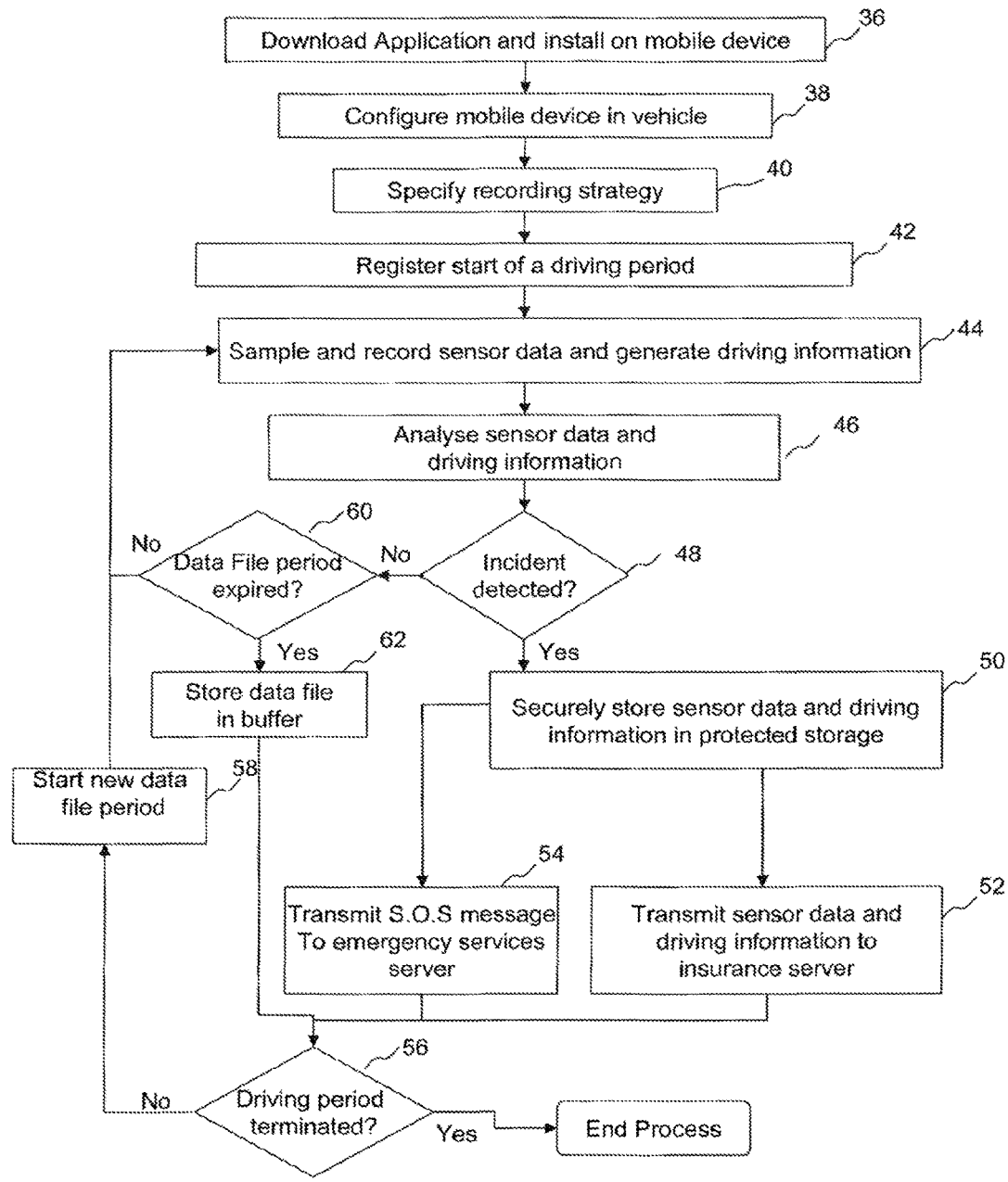
FIG. 4a is a process flow chart, illustrating method steps executable by the mobile device of FIGS. 2 and 3.

FIG. 4a is a flow chart outlining the method carried out by the mobile telecommunications device 17, to determine if a driving incident has occurred, in accordance with a preferred embodiment. An application is downloaded from the content provider server 9 of FIG. 1, onto the mobile telecommunications device 17, at step 36, as previously described. This may be done over a telecommunications network. The application provides the mobile telecommunications device 17 with the previously described functionality, when executed on the device. The mobile telecommunications device is configured within the vehicle, at step 38. This may comprise affixing the mobile telecommunications device 17 to the vehicle via an adapter, as described previously.

The recording strategy is specified at step 40. As mentioned previously, this comprises setting the period of time that each recorded data file represents. Furthermore, it may also comprise defining the size of the buffer 34a and/or the number of data files that are to be stored within the buffer. Preferably, the recording strategy is specified only once, upon first use of the mobile telecommunications device 17. Where the recording strategy has already been defined, method step 40 is skipped, and the method continues with step 42.

The start of a driving period is registered, at step 42. The start of the driving period determines when the recording of sampled sensor data begins. The start of a driving period may be manually entered by the user via the application's graphical user interface (GUI). Alternatively, the start of the driving period may be automated. For example, the mobile device 17 may be configured to initiate the driving period once sensor data above a minimum threshold value is recorded, indicative of the vehicle being in motion. For example, once a velocity greater than 20 kilometers per hour is detected.

Alternatively, the start of the driving period may be initiated once the application determines that the mobile telecommunications device 17 has been affixed to the vehicle. For example, the adapter 21 may comprise a registration module (not shown) arranged to register the installation and fixation of the mobile device to the vehicle and/or adapter. The registration module may comprise an NFC device. When the mobile device is brought into close proximity with the registration module, a driving period is initiated.

Once the driving period has been initiated, sensor data is sampled and recorded in storage 34, at step 44. Additionally, the sampled sensor data is used to generate driving information by the processor module 33. The sampled sensor data and the driving information is continuously analysed by the processor module 33, at step 46.

The processor module 33 determines if a driving incident has been detected, at step 48. This is determined on the basis of the analysis carried out at step 46. If a driving incident has been detected, all the sensor data and driving information associated with the data file period, is stored in a data file in protected storage 34b, at step 50.

There are several ways in which a driving incident may be detected. Preferably, this is an automated process, wherein the processor module 33 determines a driving incident has occurred on the basis of an observed marked variation in sensor data and/or driving information. The term 'marked variation' is to be understood to relate to a significant change in sensor data and/or driving information occurring over a very short time period. In other words, a detected impulse in recorded sensor data and/or driving information, indicative of a significant change in the state of motion of the vehicle occurring over a short time period. For example, a sudden increase in the g-forces the vehicle is subjected to, may be indicative of a collision and if observed, result in a driving incident being determined to have occurred by the processor module 33.

Predefined threshold values may also be used to automate the detection of a driving incident. For example, each data type and/or derived driving information (e.g. acceleration, velocity, g-force, pitch, roll, yaw etc.) may be associated with a threshold value. When any one of these threshold values is exceeded, the processor module 33 may be configured to determine that a driving incident has occurred. Similarly, the automated detection of a driving incident may require that a threshold condition associated with a combination of predefined threshold values, each threshold value being associated with a different data type and/or type of driving information, must be exceeded, in order for the processor module 33 to automatically determine that a driving incident has occurred. For example, in the event of a collision, it is reasonable to expect to observe a marked variation in g-force, accompanied by a marked variation in velocity. Accordingly, the threshold condition may require that in order for a collision to be automatically detected, both a marked variation in g-force and a marked variation in speed, in excess of predefined threshold values must be observed.

Similarly, the occurrence of a driving incident may also be recorded manually by the user via the application GUI. This may be beneficial for the purposes of documenting data associated with a low velocity collision—colloquially referred to as a 'lender-bender'—which may not result in any marked variations in sampled sensor data, and therefore may not be automatically detected.

Once a driving incident, such as a collision, has been detected, and the data file comprising the associated sensor data and driving information has been securely stored in protected storage 34b, the data file is transmitted to the insurance server 5 of FIG. 1, at step 52. The data file informs the insurance provider that a driving incident has occurred and provides the insurance provider with the sensor data and derived driving information. This data assists the insurance provider in better understanding the collision, in addition to assisting with determining culpability, where more than one vehicle are involved.

Similarly, once a driving incident has been detected, an S.O.S. message may be automatically forwarded from the mobile telecommunications device 17 to the emergency services server 7, at step 54. The S.O.S. message may also comprise sensor data and derived driving information, which may assist the emergency services in coordinating their response.

As mentioned previously, the mobile telecommunications device 17 will continue to sample and record sensor data even once a driving incident has been detected, unless the mobile telecommunications device 17 detects that the driving period has terminated, at step 56. If the driving period has terminated, the present method is terminated and the device stops recording sensor data. The end of a driving period may be automatically detected by the processor module 33, if certain conditions are met. For example, if the measured velocity of the vehicle remains zero for a predetermined period of time, the processor module 33 may infer that the vehicle is stationary and no longer being driven, and accordingly ceases recording sensor data, and the method is terminated. If instead the processor determines that the driving period has not yet terminated, a new data file period is initiated, at step 58, and steps 44 through 62 are repeated.

Where a driving incident is not detected at step 48, the processor module 33 will determine if the data file period has expired, at step 60. If the data file period has expired, then the sensor data and the derived driving information generated during the data file period is combined and stored in a single data file, for storage in the buffer 34b, at step 62. The processor 3 then determines, at step 56, if the driving period has terminated. If the driving period has not terminated, a new data file period is initiated, at step 58. The mobile telecommunications device 17 continues to sample sensor data, to derive driving information, and steps 44 through 62 are repeated, until the driving period is determined to have terminated.

Figure 4B:
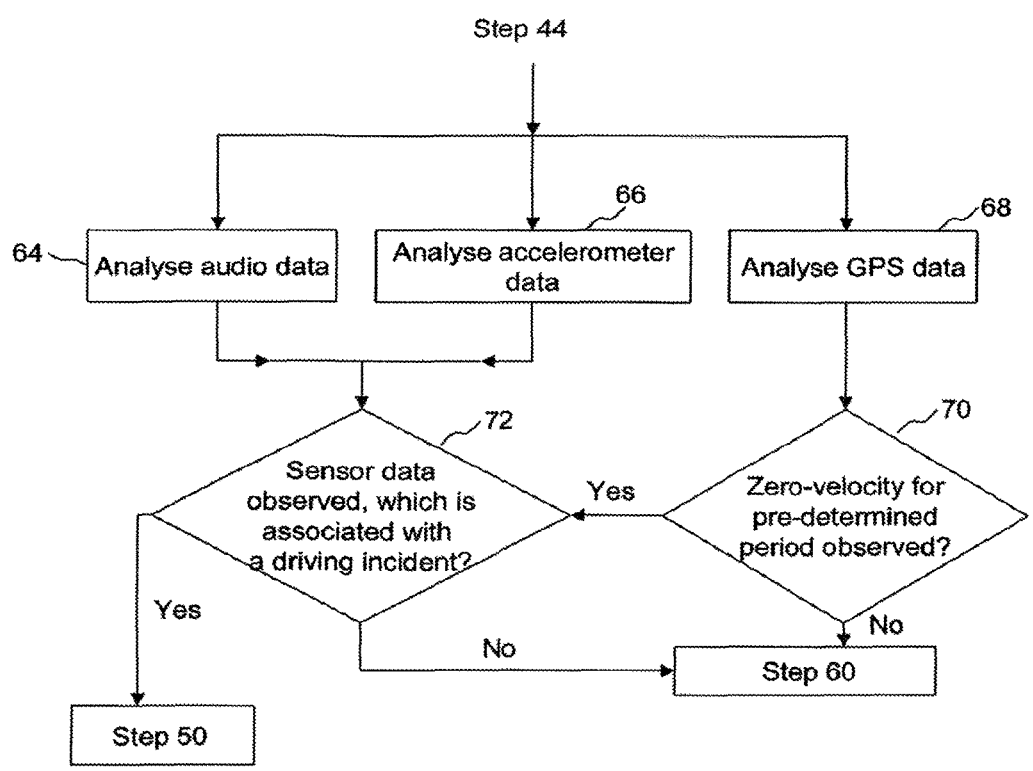
FIG. 4b is a more detailed process flow chart, providing an example of how a driving incident or event may be detected in accordance with embodiments of the present invention.

FIG. 4b provides more detail regarding how a driving incident may be automatically detected (i.e. steps 46 and 48 of FIG. 4a) in a preferred embodiment, where the mobile telecommunications device 17 is configured to sample audio data, accelerometer data, and GPS data only. Each one of these types of data is analysed in turn, at steps 64, 66 and 68. The analysis may comprise comparing measured sensor data and/or derived driving information with a data model. The model may comprise defined threshold values for different data types. Sampled sensor data and/or driving information may be compared with the data model to determine if a driving incident has occurred.

For example, the analysis of sampled audio data, at step 64, may comprise comparing the recorded audio data with predetermined audio data models representing specific sounds. Such sounds may relate to the sound of tyre squeals, the sound of deforming metal, the sound of breaking glass, passenger screaming and/or shouting, the sound of airbag deployment, and any other sound which may be associated with a driving incident. Effectively, this may be considered audio fingerprinting, which serves to identify specific sounds associated with a driving incident by carrying out a signal profile analyses of the audio signal captured by the audio capture module 27. To achieve this, the storage device 34 may comprise a database of prestored audio sound files. The audio sound files represent sounds associated with a driving incident. The captured audio signal is compared with the sound files comprised in the database, to identify matches between the captured audio signal and the database of sound files. This facilitates the audio fingerprinting of specific sounds, indicative of a driving incident, present within the captured audio data signal captured by the audio capture module 27.

Similarly, the analysis of sampled accelerometer data, at step 66, may comprise comparing the sampled data with predetermined accelerometer data models. The data models represent specific states of motion of the vehicle. For example, this might comprise defining threshold values for yaw, pitch and roll, which if exceeded, indicate a state of motion of the vehicle indicative of a driving incident. For example, a measured yaw value above a predetermined threshold value may be indicative of the vehicle having lost traction and is fishtailing and/or skidding. Similarly, a roll and/or pitch value above a predetermined threshold value may be indicative of the vehicle having overturned.

Accelerometer sensor data is also used for deriving driving information such as g-forces. Analysis of g-force data is also used to determine if a driving incident has occurred. For example, approximate g-force values for detecting certain driving incidents are as follows:

Harsh braking—a deceleration of greater than 2.5 m/s$^2$ or forward G-force of greater than 0.7 G for more than 400 msec.

Harsh acceleration—from stationary, an acceleration greater than 2.5 m/s$^2$ or backward G-force of greater than 0.7 G for more than 800 msec.

Harsh swerving—lateral G-forces greater than 0.7 G for more than 400 msec.

The data models are preferably preconfigured and are comprised within the application executed on the mobile telecommunications device. Different data models are used depending on the type of vehicle the telecommunications device is being used with. Different vehicle types will experience different states of motion during regular operation, which must be considered in determining if a driving incident has occurred. For example, a motorcycle will display more roll and/or pitch than an automobile during regular operation. Accordingly, different data models and/or threshold values must be used to automate the identification of a driving incident for different vehicle types. The specific data models used may be selected during an initial configuration of the mobile telecommunications device, by indicating the type of vehicle the device is being used with.

On the basis of the audio data analysis and the accelerometer data analysis, the mobile telecommunications device determines, at step 72, if a driving incident has occurred. If it is determined that a driving incident has occurred, then the telecommunications device proceeds with step 50 of FIG. 4a. If instead a driving incident is not detected, the telecommunications device proceeds with step 60 of FIG. 4a.

The GPS data analysis, at step 68, comprises analysing positional data and velocity data for any anomalous readings. For example, a sudden deceleration followed by a zero-velocity reading lasting a predetermined period of time, may be indicative of a collision. If such a zero-velocity reading is observed at step 70, in conjunction with anomalous audio and/or accelerometer sensor at step 72, then a driving incident is determined and the mobile telecommunications device proceeds with step 50 of FIG. 4a. This is a further example of a threshold condition, discussed previously.

The previously described mobile telecommunications device and method may also be used to monitor and generate a driver profile. The driver profile may be indicative of the type of driver a user is. For example, this may comprise determining if a user is a calm and patient driver, or an aggressive driver. Also, this may comprise determining whether a user regularly flouts speed limits, and/or ignores safety distances. This type of information may be used by an insurance provider to conduct a personalised risk assessment for individual users. Insurance premium rates may then be tailored to the specific user on the basis of the personalised risk assessment.

For example, analysis of captured image data, such as video footage, may be used to determine if a user regularly flouts safety distances. In preferred embodiments, the mobile telecommunications device is arranged within the subject vehicle to have a clear line of sight of the road in the direction of principle motion. Accordingly, the number plate of any vehicle preceding the subject vehicle will be captured by the image capture module. Since the physical dimensions of number plates are standardised and known in each country, they may be used as a metric to scale the captured image. When combined with the known optical characteristics of the image capture module, this enables the distance of the image capture module from the image object (i.e. the preceding vehicle) to be determined at the time of image capture. This information may then be used to see if a user adheres to recommended safety distances. A user that is observed to regularly flout recommended safety distances, may be considered to represent a greater risk, and accordingly may be required to pay a greater insurance premium than a user who regularly respects recommended safety distances.

Image analysis can also be used to determine driving conditions and the driving environments. For example, image processing can detect road signs, such as stop signs or traffic lights. Furthermore, driving conditions, as affected by the weather can be determined. For example, if the windscreen wipers are detected to be in motion, it can be inferred to be raining. Once the driving conditions are so determined, an assessment of the driving performance of a user can be made by determining whether the user reacts or behaves appropriately to the driving conditions. For example, if the driver is seen to be jumping red lights, or driving dangerously in rain or snow, then a higher risk profile may be assigned to that driver.

Similarly, accelerometer and g-force data may be used to determine if a user has an erratic driving style. For example, a user that generates sharp variations in g-force data and accelerometer data during regular operation of a vehicle, may be considered to drive erratically, and therefore at greater risk of being involved in an accident, and insurance premium rates for the user may be tailored accordingly.

The mobile telecommunications device may also be configured to interface and communicate directly with a vehicles native telemetry systems. For example, the majority of modern cars have inbuilt electronic control systems or engine management systems, arranged to collect data regarding vehicle system performance. This data may be communicated to the mobile telecommunications device either via a wired physical connection, such as USB (Universal Serial Bus), or via a wireless communication protocol such as Bluetooth®. This data may subsequently be used by the mobile telecommunications device to complement sensor data captured directly by the telecommunications device. In this way a more accurate model of a driving incident, and/or of a user profile may be generated. For example, native vehicle telemetric systems may comprise electronic tyre pressure sensors, and are able to detect if a tyre is under and/or over-inflated. This information may be communicated to the mobile telecommunications device and may help to explain the causes for a driving incident, such as a sudden loss of traction resulting from a burst tyre.

Further features of the Witness application, are set out below.

Benchmarking

It will be appreciated that different sensor types, phones, mounting positions, vehicles, drivers and road conditions may generate differing outputs for driving behaviour that is 'safe'. To account for this, the Witness application may have the following functionality:

During a 'training mode' (e.g. first week of enabling the Witness application) the input from the sensors are used to build up a 'benchmark' for a particular driver's typical driving conditions.

Assuming an accident does not occur during this training mode, the benchmark data can be subsequently used to assess the occurrence of driving incident.

There is preferably an option to notify the Witness application of a change in parameters (e.g. different driver, driving off-road etc). Thus a number of 'profiles' may be set up. Each profile may require an independent training mode period.

If the Witness application incorrectly detects that a driving incident has occurred, it can receive feedback from the user to modify its sensitivities. E.g. a more aggressive driver is actually driving.

Crash/Collision Management

On detection of a crash (or other driving incident) the Witness application is arranged to take one or more of the following actions:

Announce that it has detected an accident (audio/screen prompt)

Call the emergency services (with option to cancel)—e.g: Audio/screen prompt: 'Witness has detected that you have been involved in a (serious) accident and will call the emergency services. If this is not the case, please cancel within 10 seconds.'

Provide reassurance

Provide the user with a checklist of things to do:

Take photographs of vehicles involved in the incident (inc number plates)

Take down name, address, insurance details etc of 3rd parties involved in incident Communicate to the insurance company that an incident has been detected (e.g. low bandwidth data or text message)

Protect the high quality recorded data so it is not overwritten

If appropriate—or in response to a request from a communication to the phone from the insurance company—transmit all or selected portions of the recorded data associated with the incident.

N.B. Use of the communication channels is controlled by the Witness application to prioritise essential communications such as calls to the emergency services.

Note that data transmission from the mobile telephone to the insurance company may be automatic (for example, triggered by a detected incident) or manual (for example, in response to a request from the insurance company). In the latter case, the Witness application may include functionality to allow the insurance company to browse through the data files available on the mobile telephone so as to select one or more for transmission to the insurance company.

Data Processing for Generating a User Profile

Further features of the user profile generation embodiment are summarised:

If the Witness application incorrectly detects an event or incident of significance, and receives feedback that the vehicle was not involved in an accident (but was in a near miss)—this could alter the risk profile of the driver. For example—if this happens frequently, but no accident occurs over a given period, this could be an indicator that the driver is good at reacting to potential hazards.

Erratic driving (e.g. jerky steering or braking detected by G-force sensor).

Driving faster than the speed limit allocated to a given road (detected by GPS).

Further details regarding the features and functionality of the Witness application, in particular the graphical user interface of the Witness application, are now described.

Figure 5:
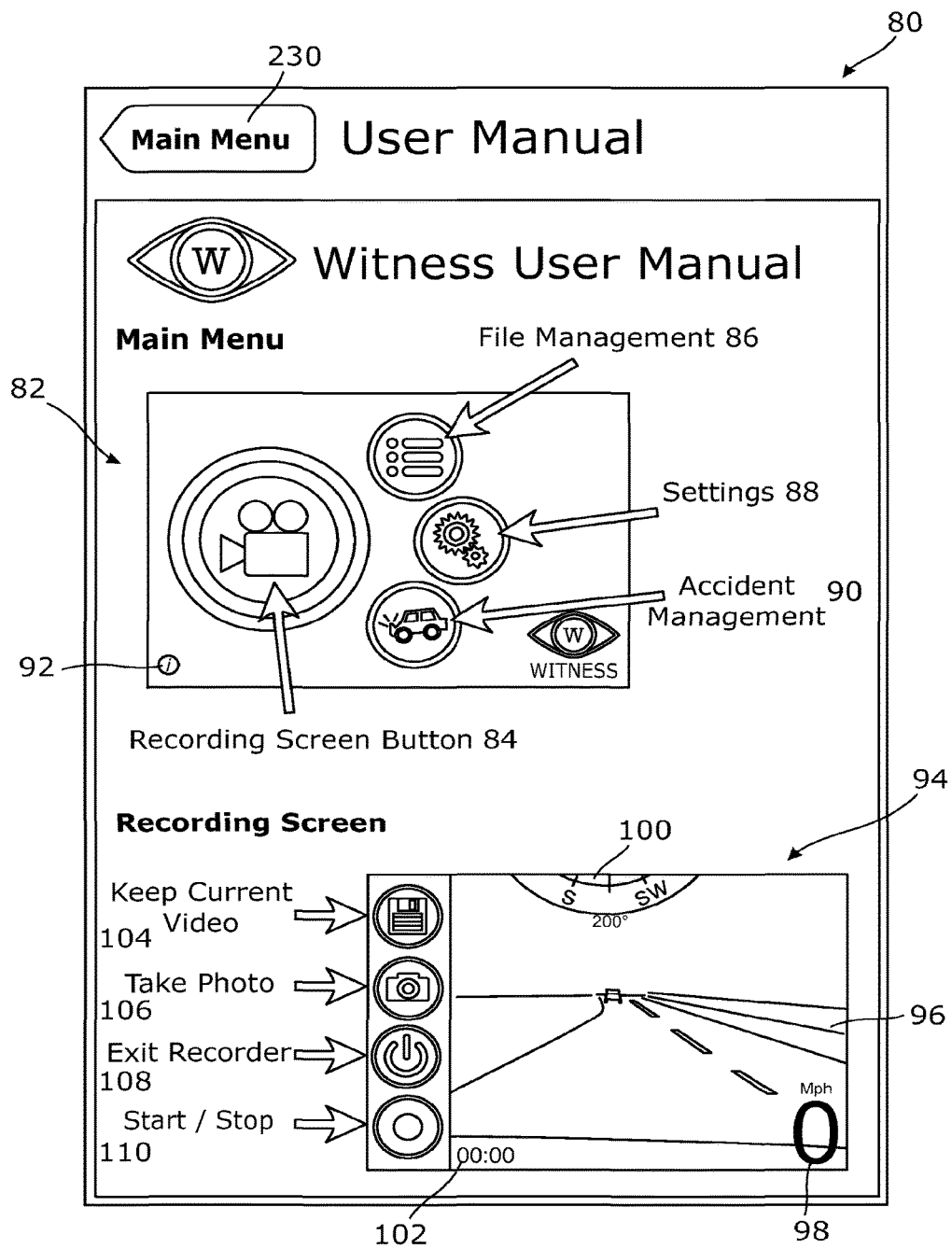

Referring to FIG. 5, a first page 80 of the Witness application user manual is shown in which an image of the Main Menu (the top-level menu) 82 is displayed. The Main Menu is displayed when a user first runs the application on a smart-phone, such as the iPhone® 4. The main menu includes the following user-selectable buttons:

Recording Screen 84

File Management 86

Settings 88

Accident Management 90

Information 92 (displays up a manual, as shown in FIGS. 5 to 14).

Selecting the Recording Screen button 84 opens the Recording Screen 94—the second image shown in FIG. 5. The Recording Screen 94 contains a video feed 96 from the camera of the smart-phone, which occupies the majority of the visible screen area. Overlaid on to the video feed is the detected speed of the vehicle 98 (e.g. 0 mph), heading 100 (e.g. south by south-west) and the elapsed recorded time 102 (e.g. 00:00). Displayed in a left column of the Recording Screen are additional user selectable buttons:

Keep current video 104 (pressing this button will automatically copy the current video—and the previous video segment—to the protected storage 34b, and prevents that information from being overwritten. The user is advised to press this button in the event of a driving incident that needs to be recorded).

Take photo 106 (captures a still photograph).

Exit Recorder 108 (returns to main screen).

Start/Stop Recording 110 (starts recording video footage—and other data).

Figure 6:
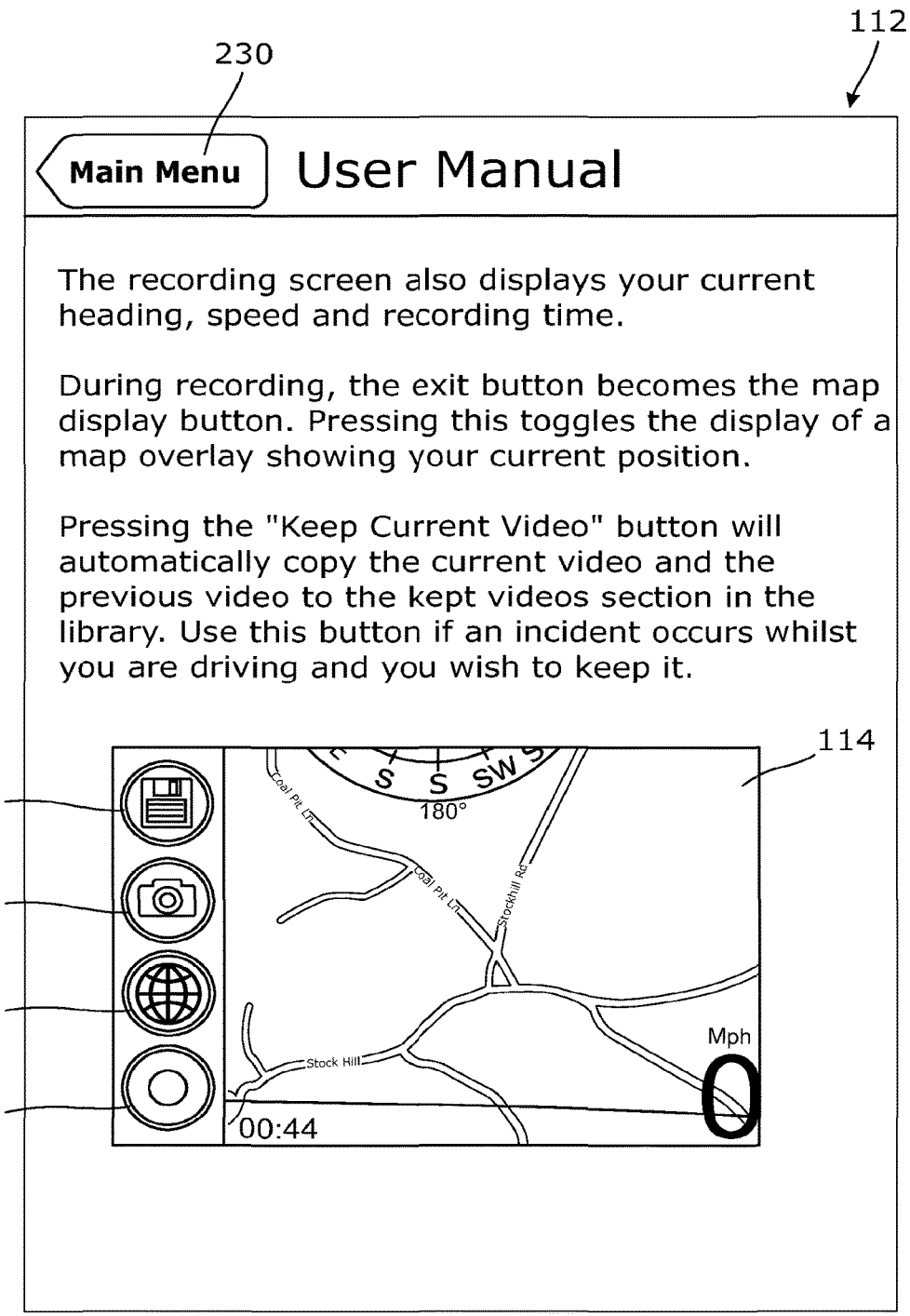

Referring to FIG. 6, a second page 112 of the Witness application user manual is shown, in which an image of the Recording Screen 114 is shown and described operating in a map-displaying mode rather than a video-feed mode.

During recording, (i.e. when the 'Start/Stop Recording' button 110 is pressed) the Exit Recorder button in the Recording Screen is substituted with a Map Display button 116. Pressing it will toggle between the modes showing the video feed and a map of the current location.

Figure 7:
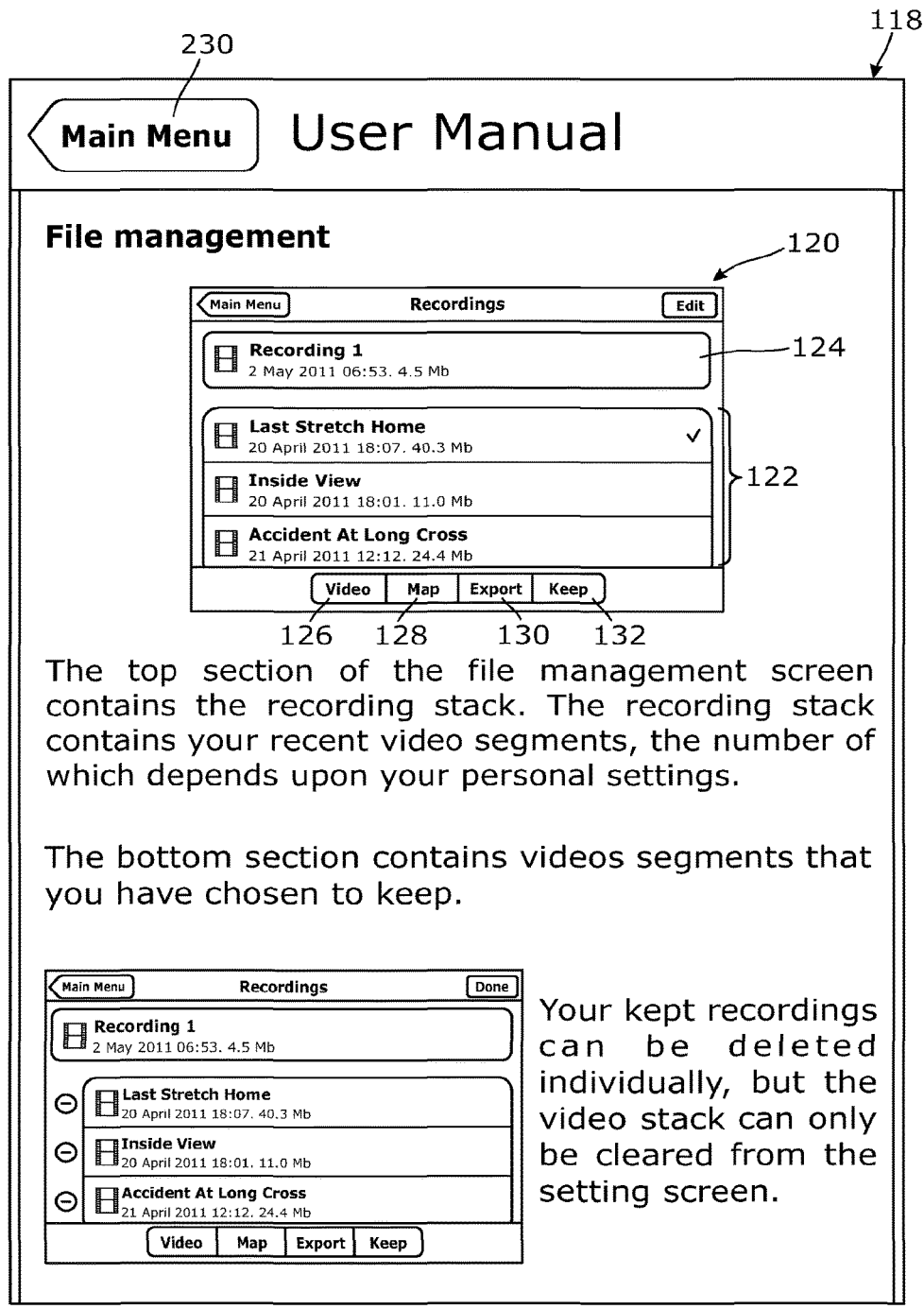

Referring to FIG. 7, a third page 118 of the Witness application user manual is shown, in which the File Management Screen 120 is shown and described. The File Management Screen 120 can be accessed by pressing the File Management Button 86 in the Main Menu.

The File Management Screen 120 displays video and associated data (e.g. telemetry data) that has been previously recorded. The stored data is contained in either a protected area of storage or in a "Recording Stack". Data files in the protected area are saved and so not overwritten as part of a Recording Strategy. In contrast, data files in the Recording Stack may be overwritten as part of the Recording Strategy.

As illustrated in FIG. 7, the bottom section of the list represents the "Kept" data files 122, whereas the top section of the list represents the "Recording Stack" 124. "Kept" data files 122 can be edited and deleted from the File Management Screen 120, whereas "Recording Stack" data files cannot. Editing "Kept" data files can involve renaming them.

The recorded data files are listed on screen along with the time and date of the recording and the electronic size of the data file. Accordingly, the user is provided with feedback about how big the data files are, and so if the smart-phone is low in storage, the user can elect to delete certain "Kept" data files. "Recording Stack" data files will be automatically overridden by the Recording Strategy.

The controls on the toolbar at the bottom of the recordings screen allow a user to change the selection mode of the video stack and includes:

Video 126 (when highlighted, if a data file is selected, a video recording playback screen will be displayed).

Map 128 (when highlighted, if a data file is selected, then a map will be displayed showing the area over which the recording was made).

Export 130 (when highlighted, a selected data file will be passed to an Export Screen where export options will be provided).

Keep 132 (when highlighted, if a "Recording Stack" data file is selected, then a user will be prompted to name it, and then it will be stored as a "Kept" data file).

Figure 20:
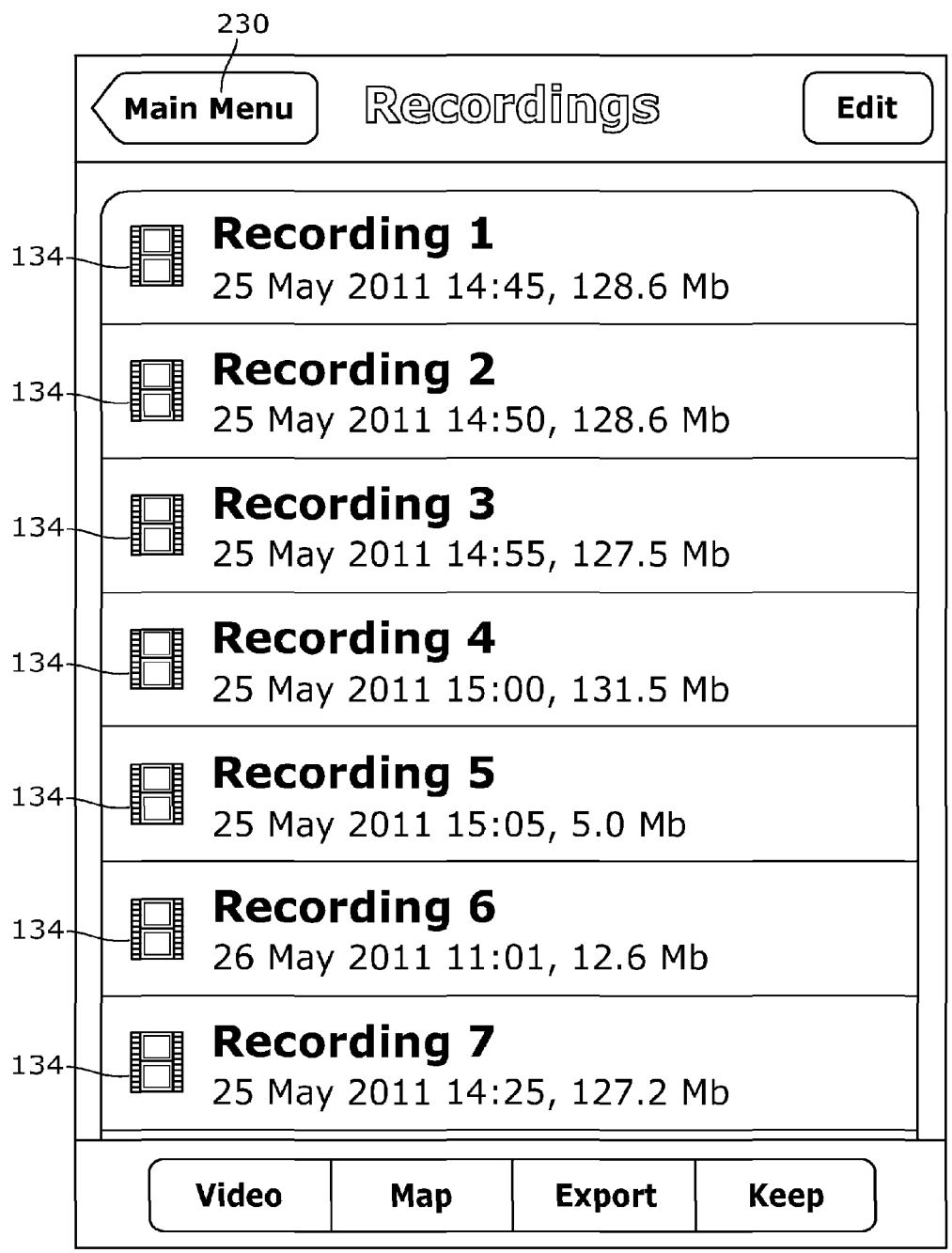
Figure 21:
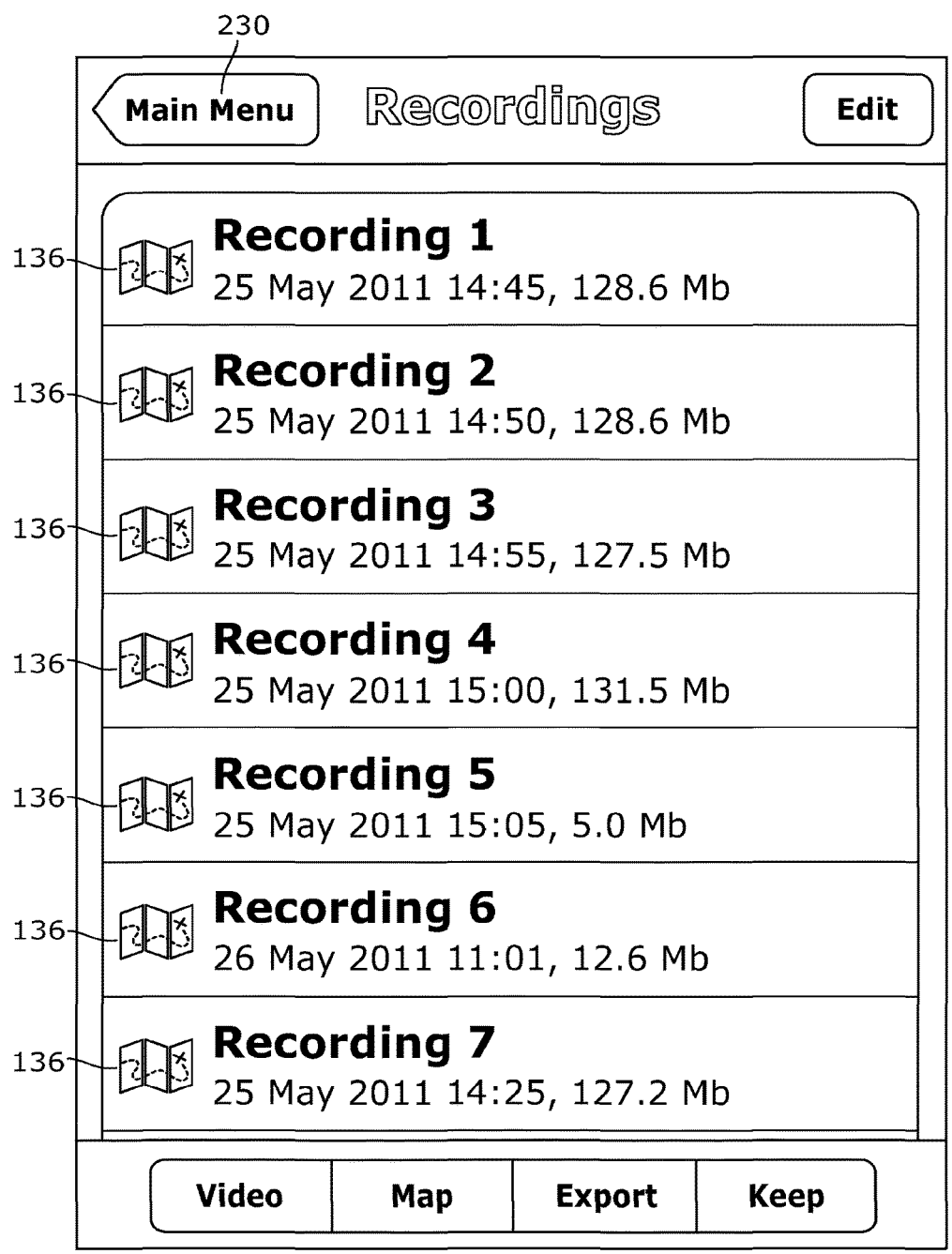
Figure 22:
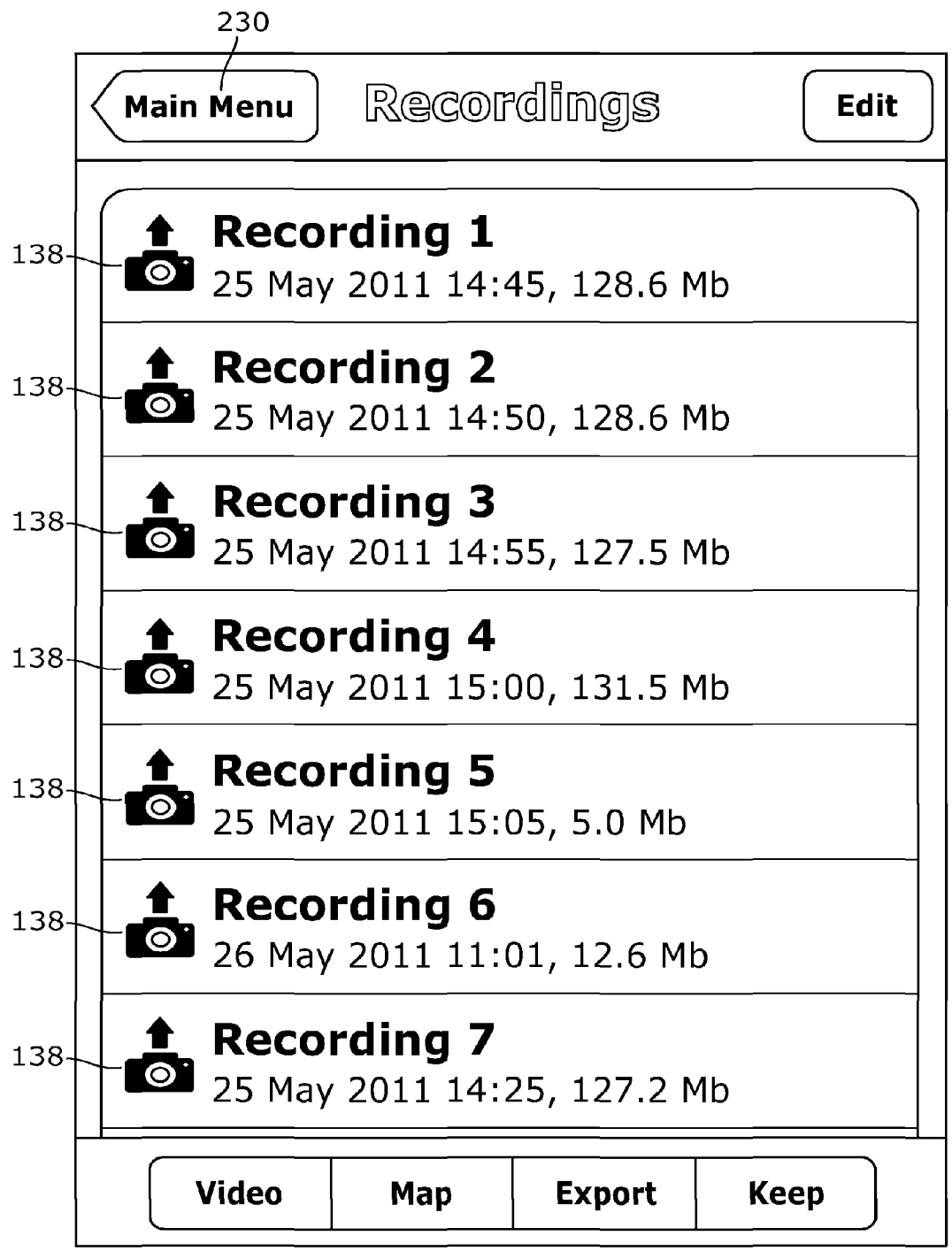
Figure 23:
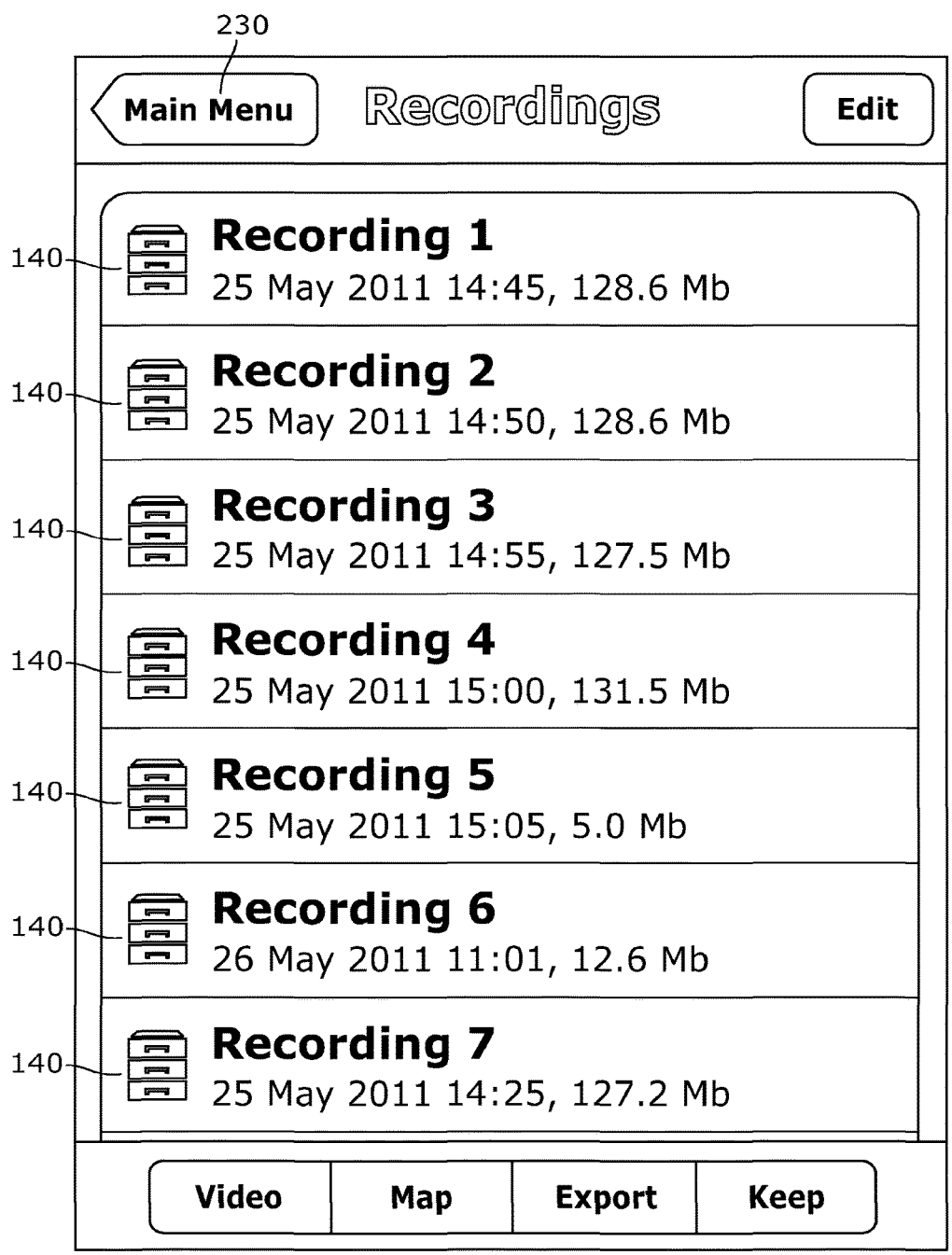

The icons in the File Management Screen change in dependence on the selected mode. For example, FIG. 20 shows the icons 134 displayed when the Video selection mode is highlighted; FIG. 21 shows the icons 136 displayed when the Map selection mode is highlighted; FIG. 22 shows the icons 138 displayed when the Export selection mode is highlighted and FIG. 23 shows the icons 140 displayed when the Keep selection mode is highlighted. Advantageously, this provides improved feedback to a user about what selection mode is highlighted and so what action is likely from the selection of a data file.

Figure 8:
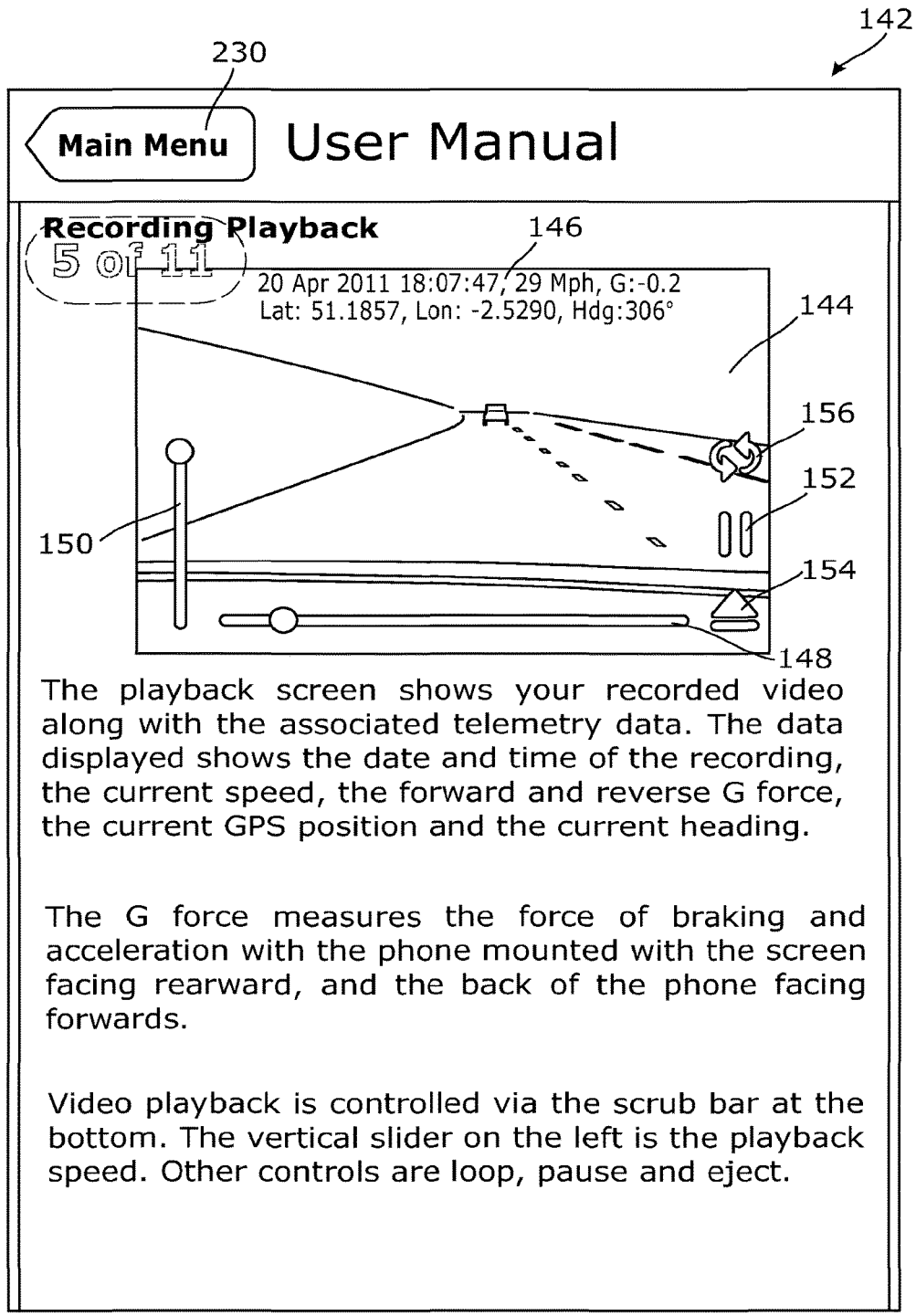

Referring to FIG. 8, a fourth page 142 of the Witness application user manual is shown, in which an image of a Recording Playback screen 144 is shown and described. The Recording Playback screen is invoked by highlighting the Video Mode 126 in the File Management Screen 120 and selecting an appropriate data file.

In the Recording Playback screen 144 it is possible to play back a pre-recorded video feed associated with a chosen data file. As well as playing back the recorded video feed, the Recording Playback screen also displays other associated data such as telemetry data 146. For example, date, time, speed, forward/backward G-forces, latitude, longitude and heading information is overlaid onto the video feed. As the video is played back, these values will typically change depending on the behaviour of the vehicle, as recorded by the mobile device.

Forward and backward G-forces are those that correspond to the forward and backward movement of the vehicle and are the primary metric for determining an event such as a crash. However, other G-forces (e.g. up/down and side-to-side) may also be measured by the device—even if they are not necessarily displayed on the mobile screen.

As recited in FIG. 8, the Recording Playback screen provides further user controls in the form of:

Playback Position Scrub Bar 148 (horizontal bar at bottom of screen)

Playback Speed Bar 150 (vertical bar at left side of screen)

Pause 152 (pauses playback)

Eject 154 (return to previous screen)

Loop 156 (plays the data file continuously)

The Playback Position Scrub Bar 148 allows a user to jump to different positions within the recording without necessarily needing to watch all of the recorded footage. Advantageously, this allows a user to more quickly locate a desired item of footage within a given data file. Also, the Playback Speed Bar 150 can be used to speed up or slow down the playback of the data file. This allows a desired item of footage to be found more quickly through sped-up playback, and also allows an item of footage to be more carefully analysed through slowed-down playback. Furthermore, it is possible to zoom in and out of a region of the video file using a 'pinch and zoom' movement as is standard with most multi-touch touch-screen devices.

Figure 9:
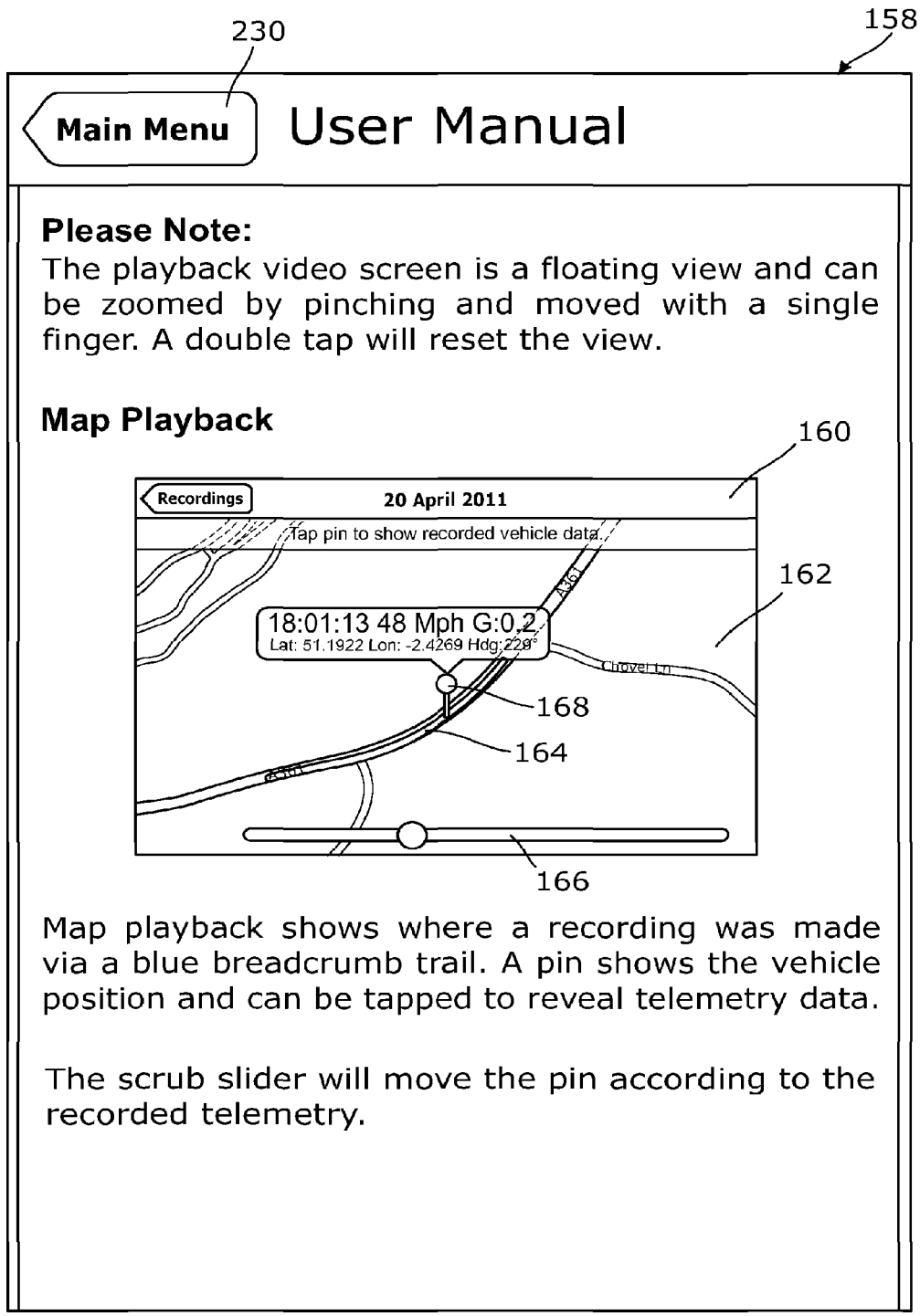

Referring to FIG. 9, a fifth page 158 of the Witness application user manual is shown, in which a different type of Recording Playback screen 160 is shown and described. Specifically, the image represents playback of a pre-recorded data file as can be invoked by highlighting the Map Mode 128 in the File Management Screen 120 and selecting an appropriate data file.

In contrast with the Video Mode playback, this Map Mode playback shows a map of the area 162 where the recording took place. A blue breadcrumb trail 164 is overlaid on to the map showing the extent of movement of the vehicle during the recorded period. A scrub slider 166 is shown, which is user-operable to adjust the time within the recorded period. As the slider is adjusted, a pin 168 moves along the blue breadcrumb 164 to show the position of the vehicle at the time as specified by the slider 166. Tapping the pin 168 displays associated telemetry data 170 at that position and time.

Figure 10:
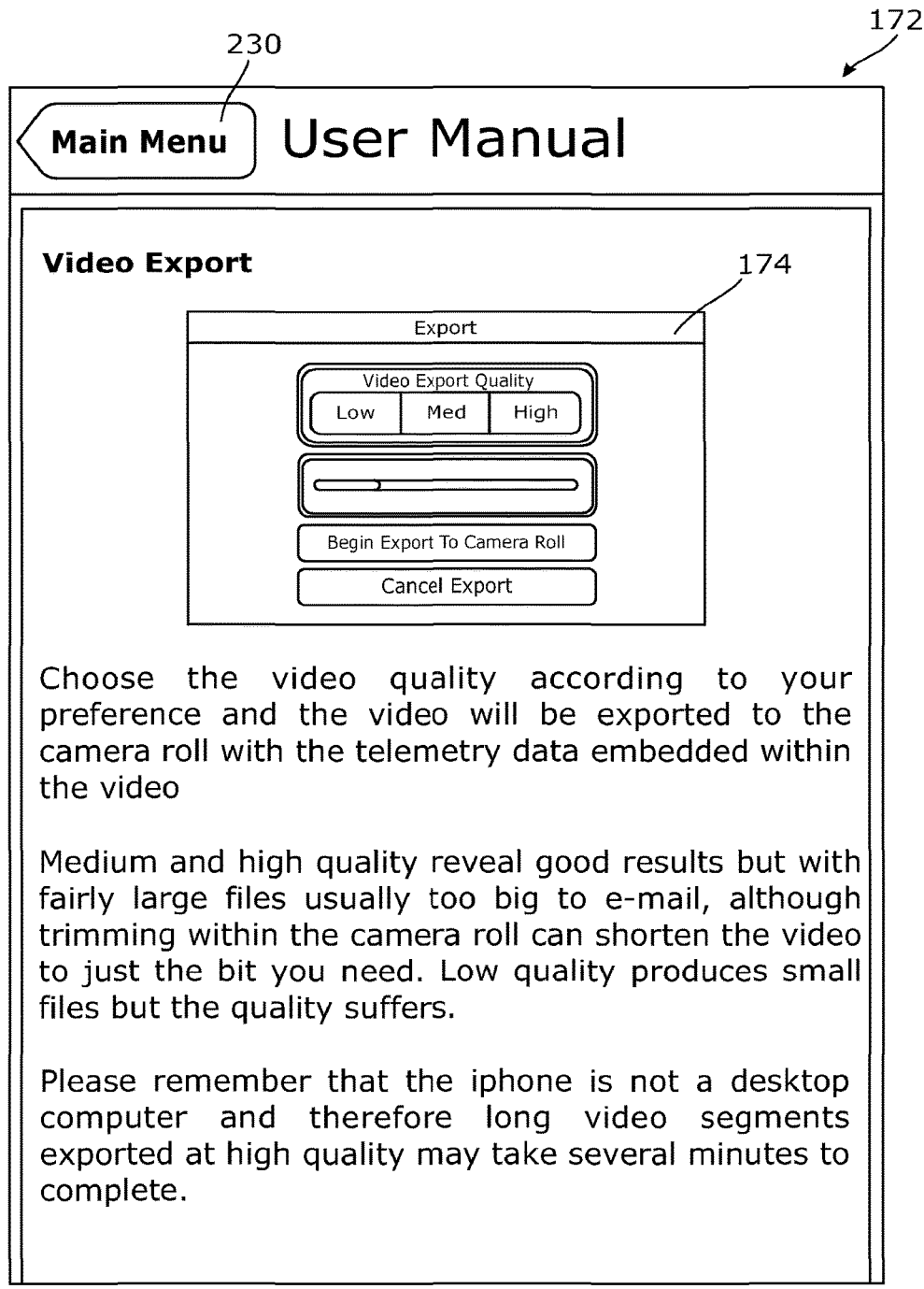

Referring to FIG. 10, a sixth page 172 of the Witness application user manual is shown, in which an image of a Video Export Screen 174 is described. The Video Export Screen 174 may be invoked by highlighting the Export button 130 in the File Management Screen 120 and selecting an appropriate data file.

The Video Export Screen 174 allows the quality of the video associated with the selected data file to be adjusted, before that video is exported. Advantageously, this can allow the user to control the size of the data to be exported. Telemetry data (i.e. sensor data) is also exported, embedded within the video file. Video data can be exported with or without sound, depending on the permissions of the user. Export typically involves copying data files from the mobile device to a local computer (e.g. via a data cable) or a remote server (e.g. via a wireless connection).

Figure 11:
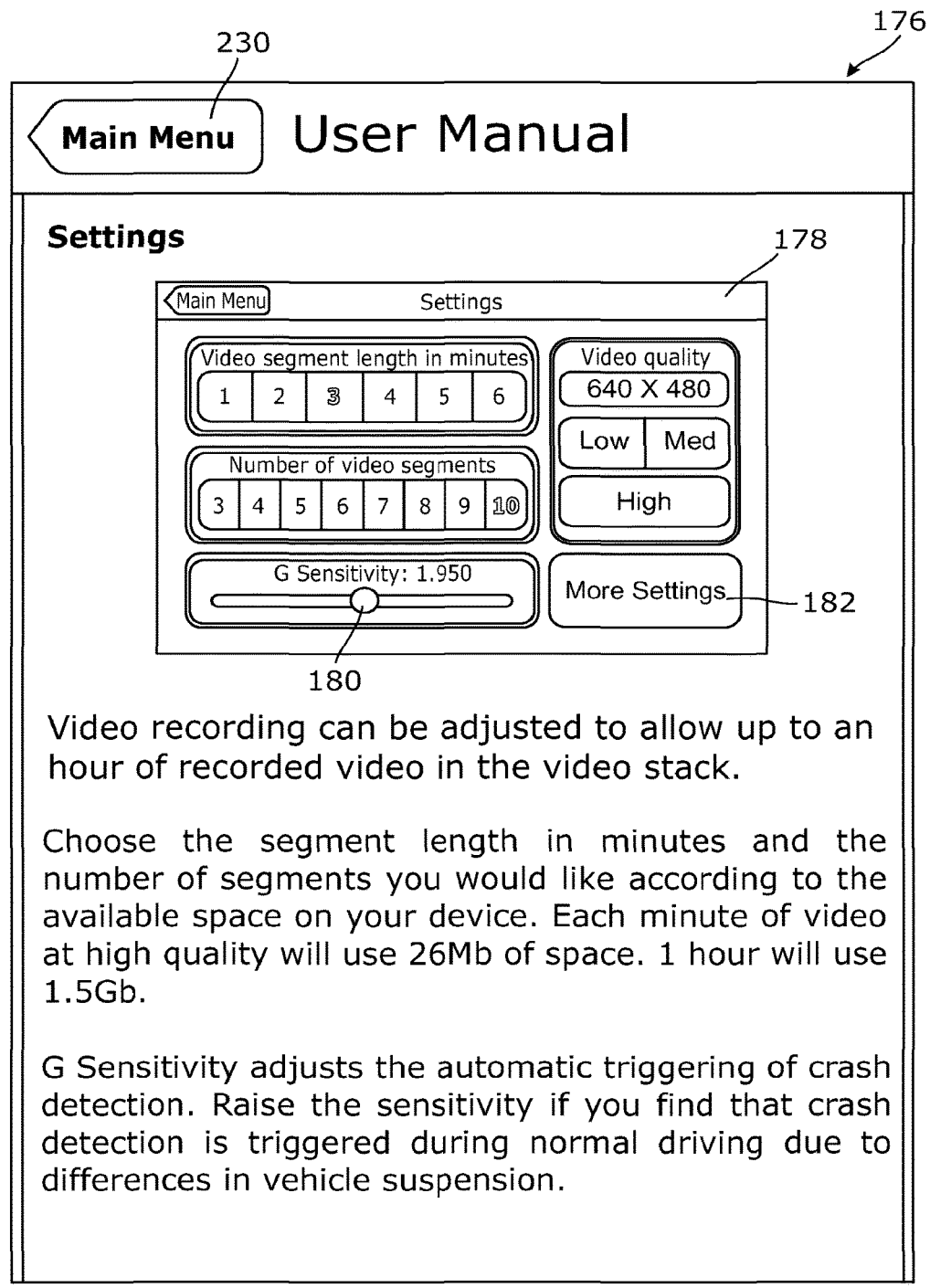

Referring to FIG. 11, a seventh page 176 of the Witness application user manual is shown, in which an image of the Settings Screen 178 is displayed and described. The Settings Screen 178 allows the operation of the Recording Strategy to be controlled. Specifically, the Settings Screen allows a user to select the number of video segments that the application should store, and the size of those segments (i.e. a data file period). Accordingly, the user is able to set a limit to the storage usage of the Recording Stack (i.e. the size of the buffer 34a) part of the program. The user can also control the storage usage of the Recording Stack through the use of the video quality buttons.

Note that the Witness application may be arranged to calculate the remaining memory available on the smart-phone and suggest the appropriate settings automatically.

The Recording Strategy involves maintaining a user-controlled number of video segments. When a new video recording is initialised—instantiating a new segment—this is written over the oldest video segment. Thus only the most recently recorded videos are maintained in the Recording Stack.

Another setting that can be controlled in the Settings Screen 178 is the G-force threshold at which the Witness application will assume that a crash has taken place. It is expected that different vehicles and driving styles will need different G-force thresholds to be set to ensure a reasonable sensitivity to crash forces whilst also prevent crash detection false positives. It should be noted that although the manual recites "Raise the sensitivity if you find that crash detection is triggered during normal driving . . . " it is the sensitivity threshold that is to be raised, and not the sensitivity itself. A slider 180 allows the sensitivity threshold to be set via the touch-sensitive screen.

The Settings Screen 178 also has a button 182 to allow a user to define more settings via a More Settings Screen.

Figure 12:
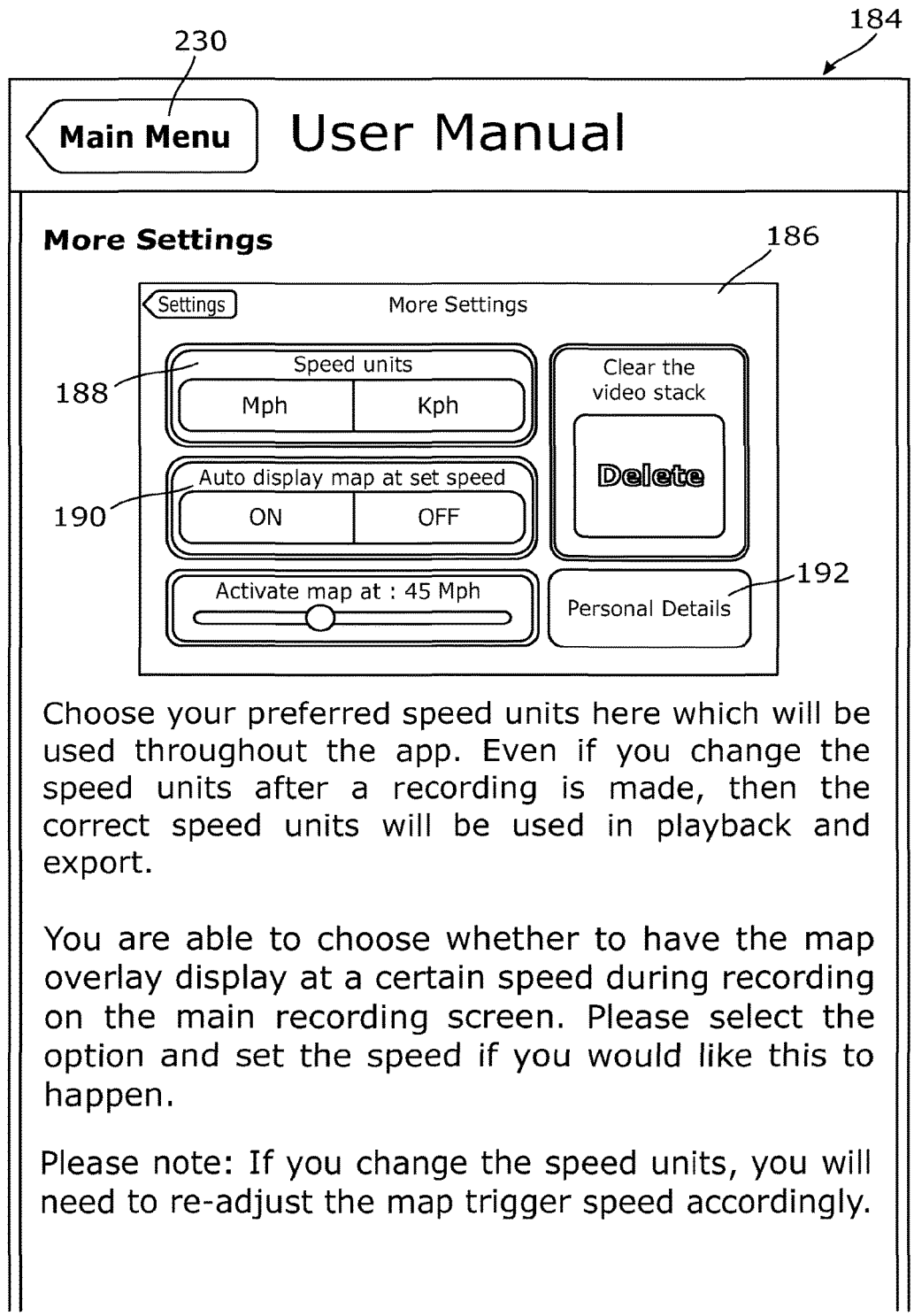

Referring to FIG. 12, an eighth page 184 of the Witness application user manual is shown, in which an image of the More Settings Screen 186 is displayed and described. Here, it is possible for the user to select speed units 188 and also select whether the map should be displayed during recording 190, and at which speed it should be displayed in favour of the video feed. This is a safety feature of the Witness application that hides the video feed during recording when the vehicle is detected as travelling above a predetermined speed. The video feed is replaced by a map of the location of the vehicle—as is typical with in-vehicle GPS devices. Note that although the on-screen video feed is replaced with a map, video recording continues in the background.

In alternatives, the application may be arranged to detect the vehicle speed, and at a particular speed, switch off the screen entirely. It should be understood that the device will continue to record video, telemetry and other information even when the screen is switched off. Entirely switching off the screen of the device is advantageous as it significantly reduces the drain on the battery of the mobile device.

Note that the Witness application is also arranged to interface with the phone to detect low-light conditions and in response change the brightness of the screen to prevent the user/driver being dazzled. This can also save battery life.

The More Settings Screen 186 also includes a Personal Details button 192 which, when pressed invokes a Personal Details Screen.

Figure 13:
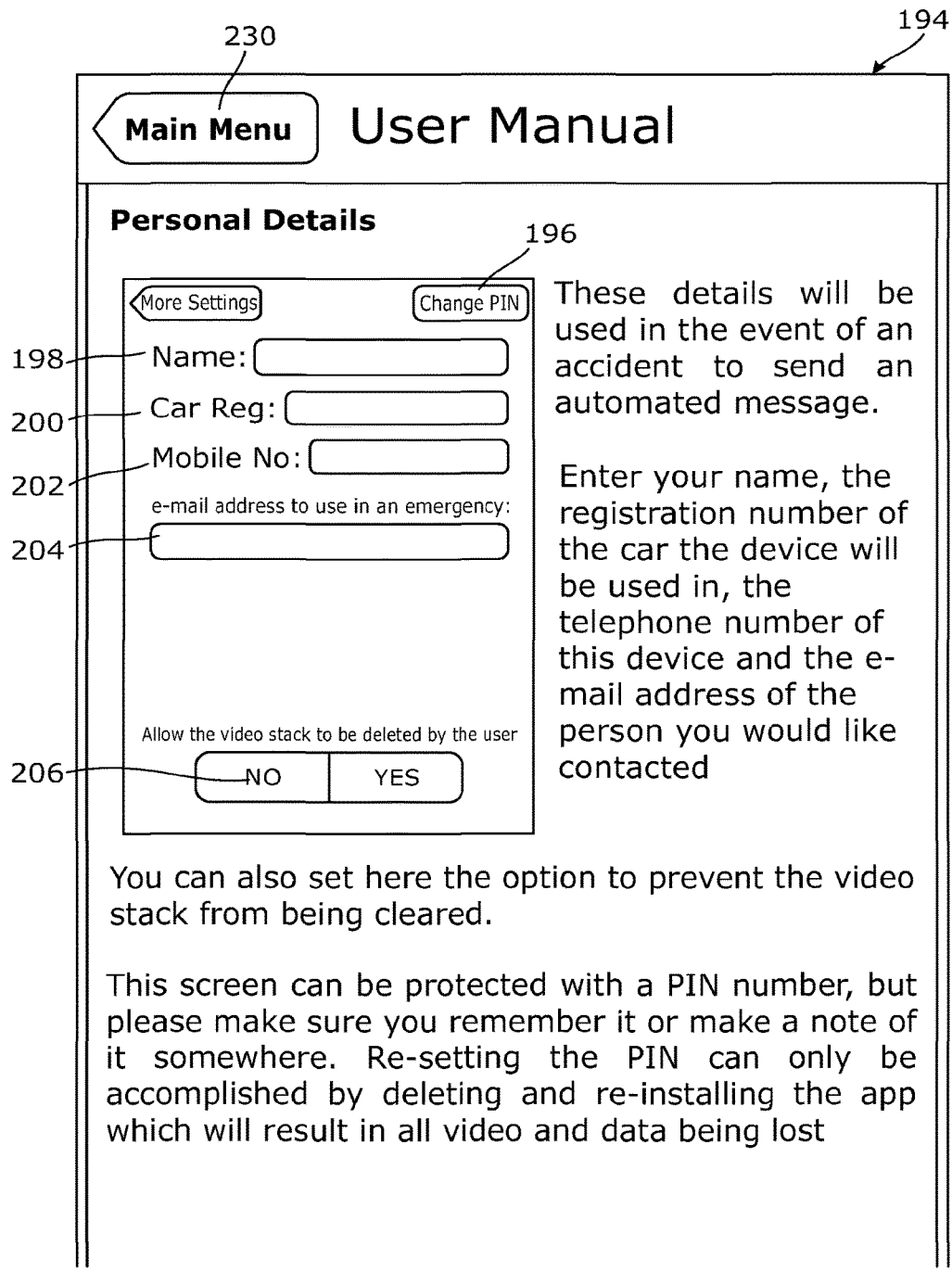

Referring to FIG. 13, a ninth page 194 of the Witness application user manual is shown, in which an image of the Personal Details Screen 196 is displayed and described.

Here, the name 198, vehicle registration number 200, mobile number 202 and email address 204 to be used in an emergency, can be specified by the user. In the event of a detected incident, these details, along with information regarding the detected incident (e.g. time of incident, location and optionally telemetry data) will be emailed to the specified email address automatically. This can ensure that the chosen recipient of that email will be informed immediately about the occurrence and nature of the detected incident.

Figure 24:
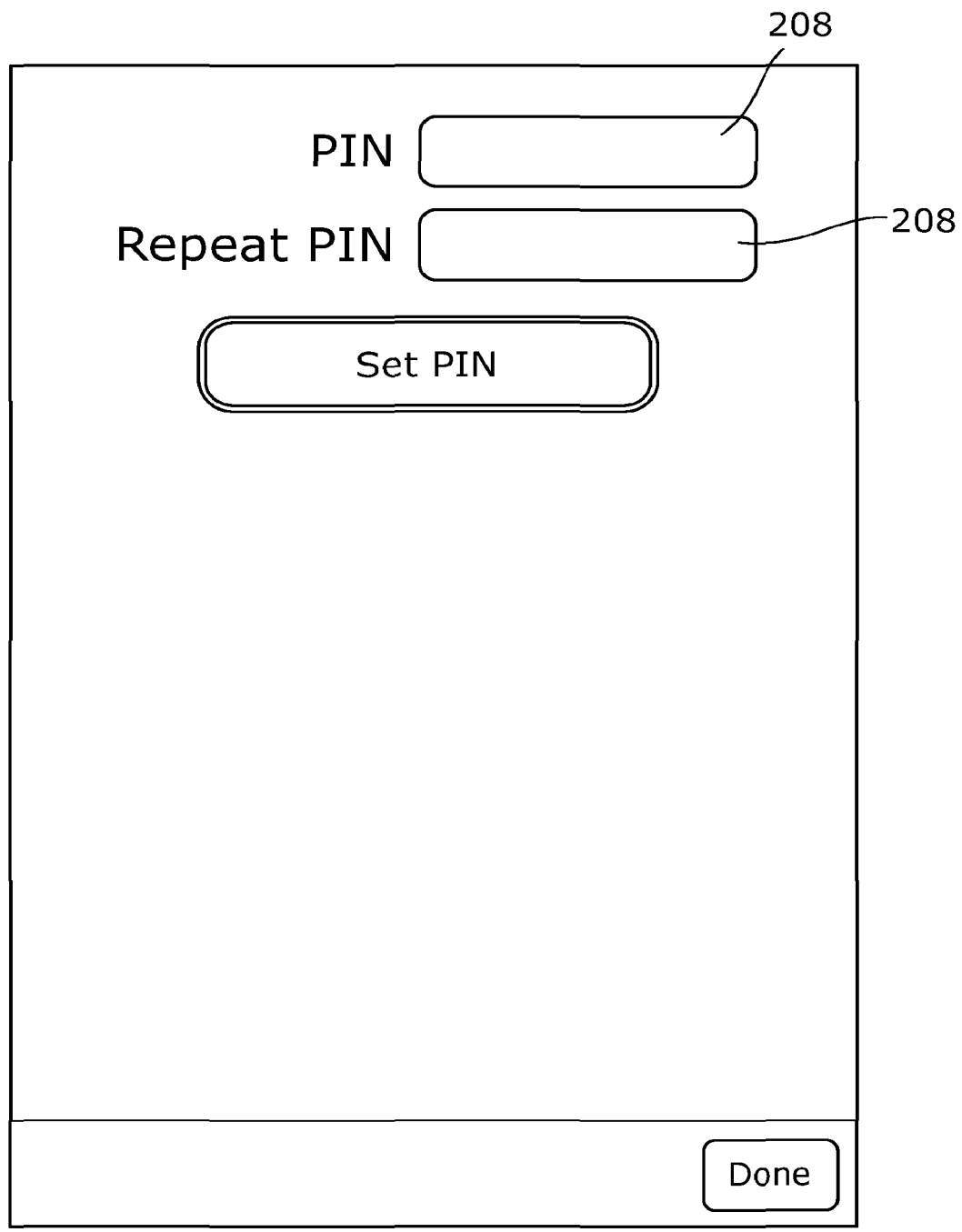

This Personal Details Screen 196 also allows the user to set whether it is possible for the video stack to be deleted 206. A security PIN protects the changing of this option so that if a first user having the PIN (for example, a parent) can review the driving style and behaviour of a second user not having the PIN (for example, their son or daughter) by reviewing the Recording Stack—as the Recording Stack cannot be deleted by that second user. As shown in FIG. 24, the PIN can be set for the first time by entering it twice into the appropriate PIN fields 208.

Figure 14:
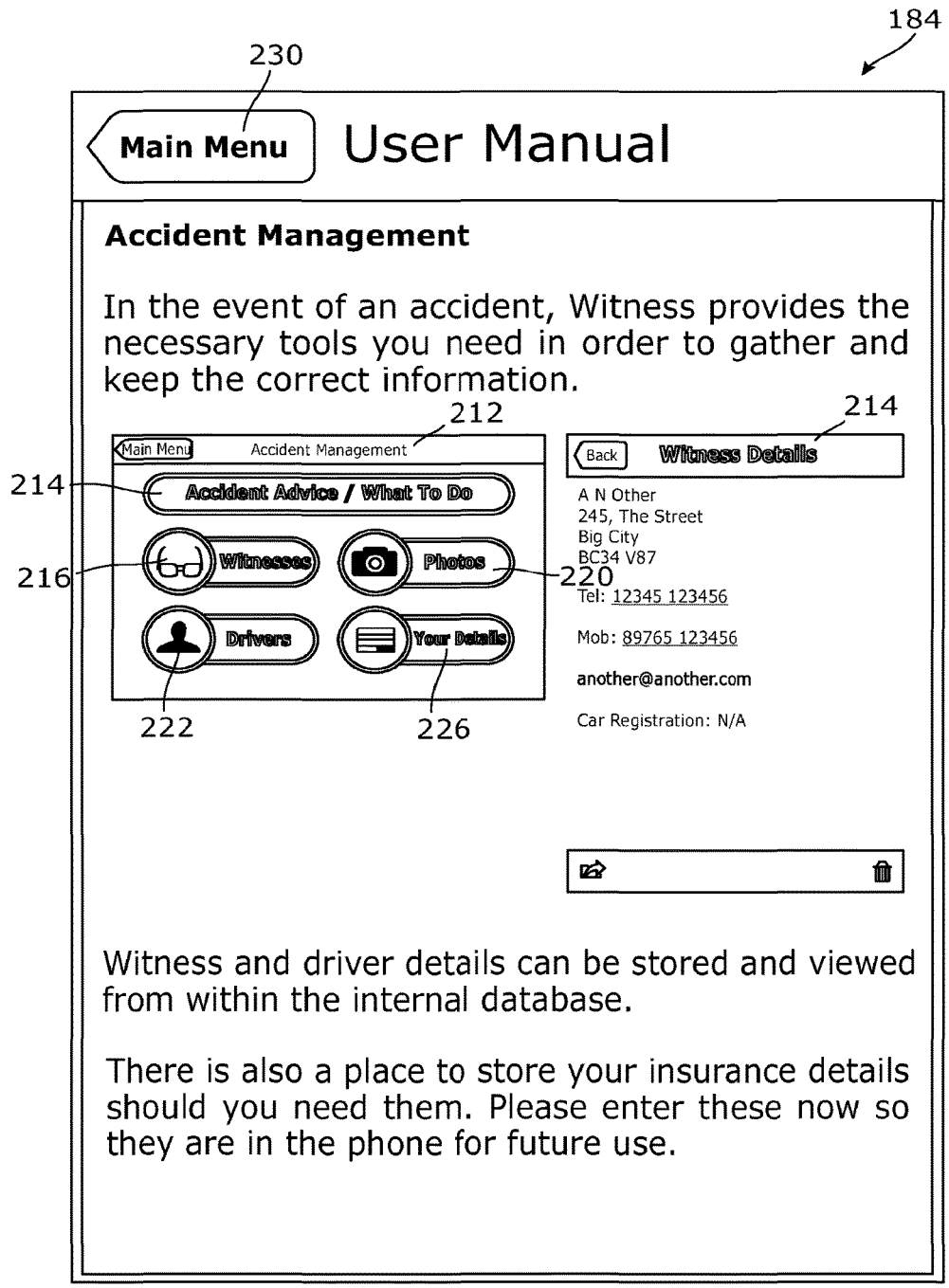

Referring to FIG. 14, a tenth page 210 of the Witness application user manual is shown, in which images of an Accident Management Screen 212 and Witness Details Screen 214 are displayed and described.

The Accident Management Screen 212 can be invoked by the user selecting the accident management button 90 on the Main Menu, or can be automatically switched to after the Witness application has detected that there has been an incident (e.g. via G-forces exceeding a threshold level). Similarly, data can automatically be permanently stored as "Kept" and/or sent if high G-forces are detected.

As can be seen on the Accident Management Screen 212, there are the following user selectable buttons:

Accident Advice/What to do 214

Figure 15:
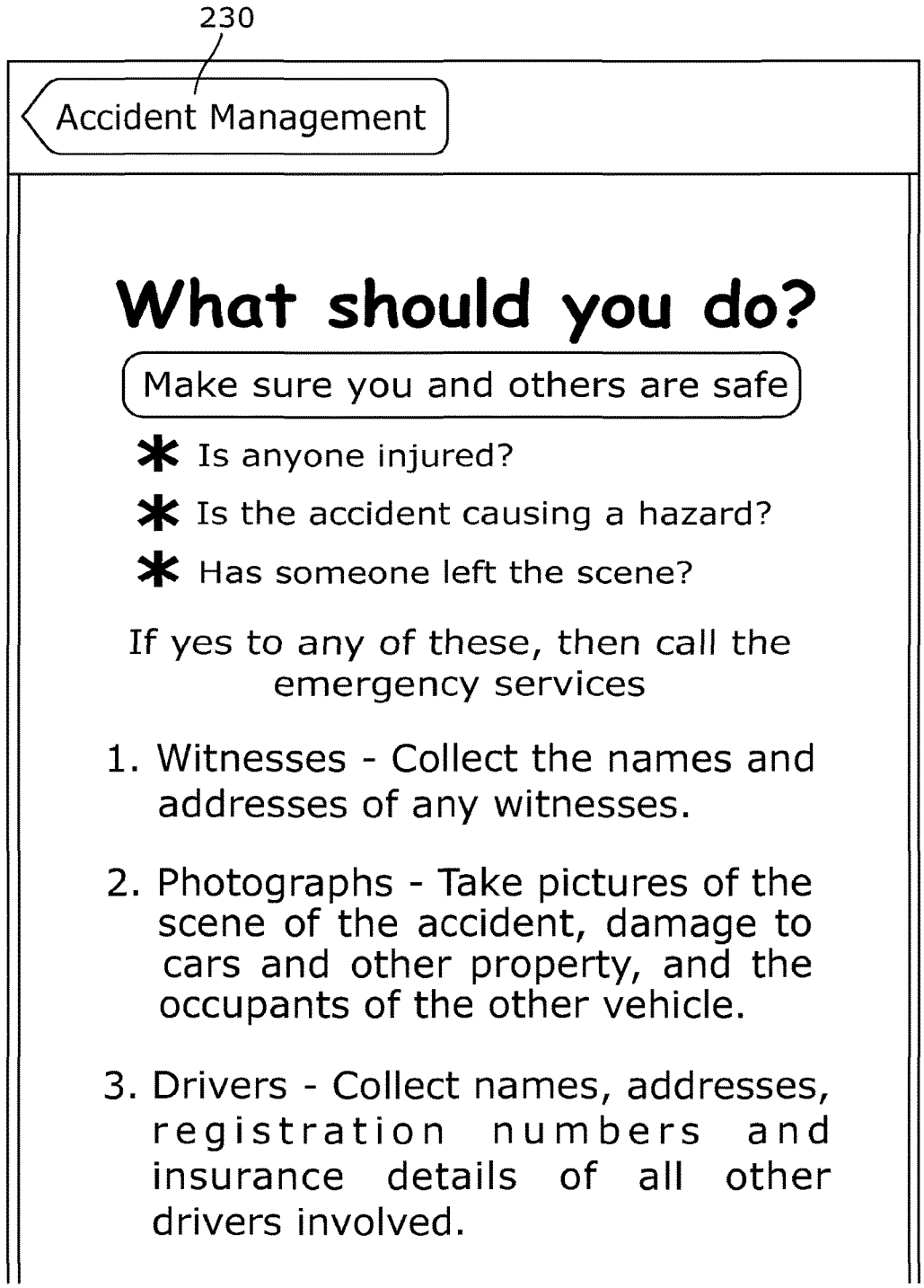
Figure 16:
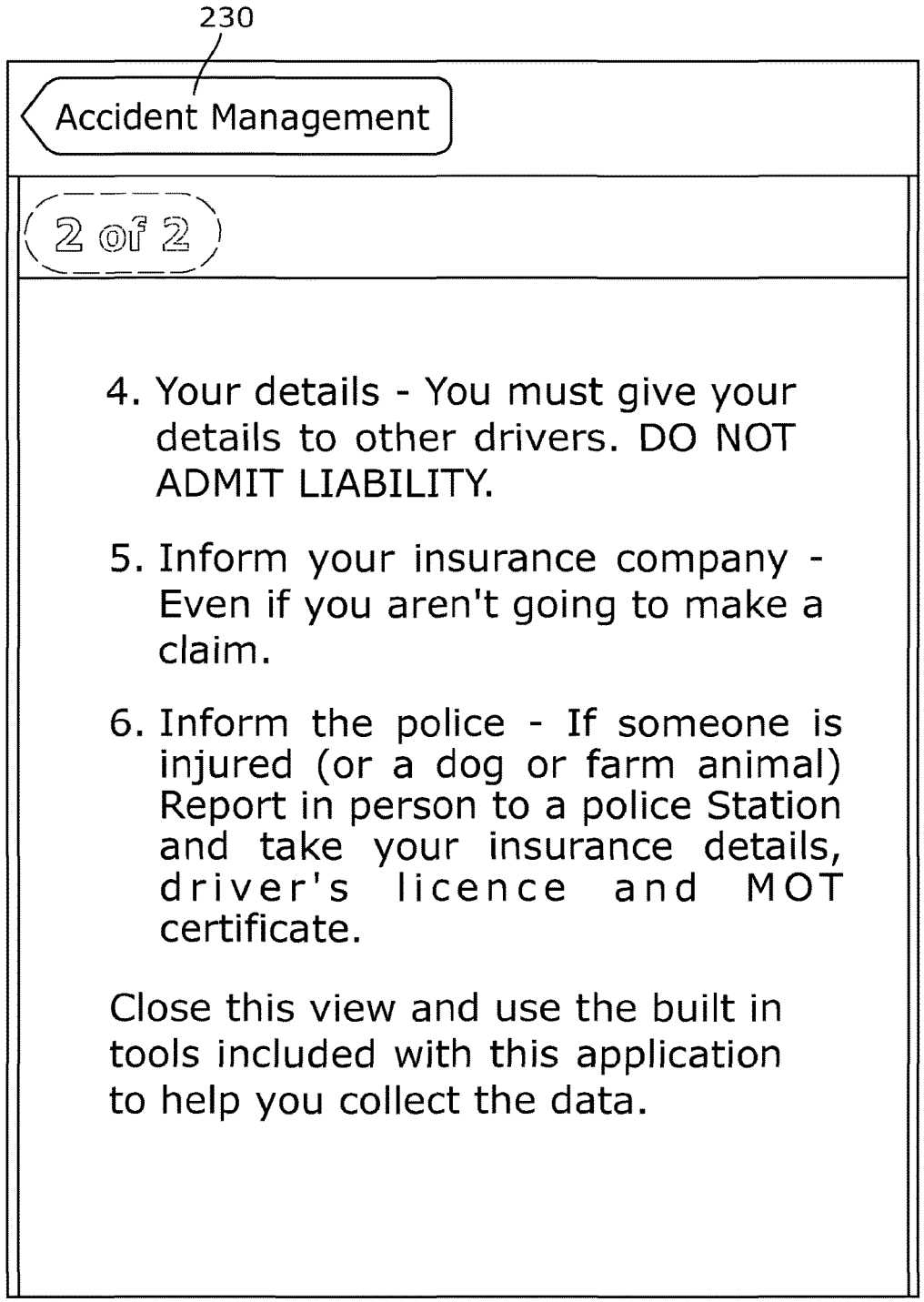

This option provides guidance as to what to do during an accident—see FIGS. 15 and 16 for the displayed Accident Advice Screens.

Witnesses 216

This option invokes functionality to allow the collection of information from or about witnesses to an incident. An image of the Witnesses Detail information summary screen 214 is shown in FIG. 14. FIG. 17 shows the Witness Detail information collection screen 218. Voice notes can also be taken via the microphone of the smart-phone.

Photos 220

This option enables the camera to allow a user to capture images associated with an incident.

Drivers 222

This option invokes functionality to allow collection about the other drivers involved in an incident, such as their vehicle and insurance details. The Drivers Detail information collection screen 224 is shown in FIG. 18.

Your Details 226

Figure 19:
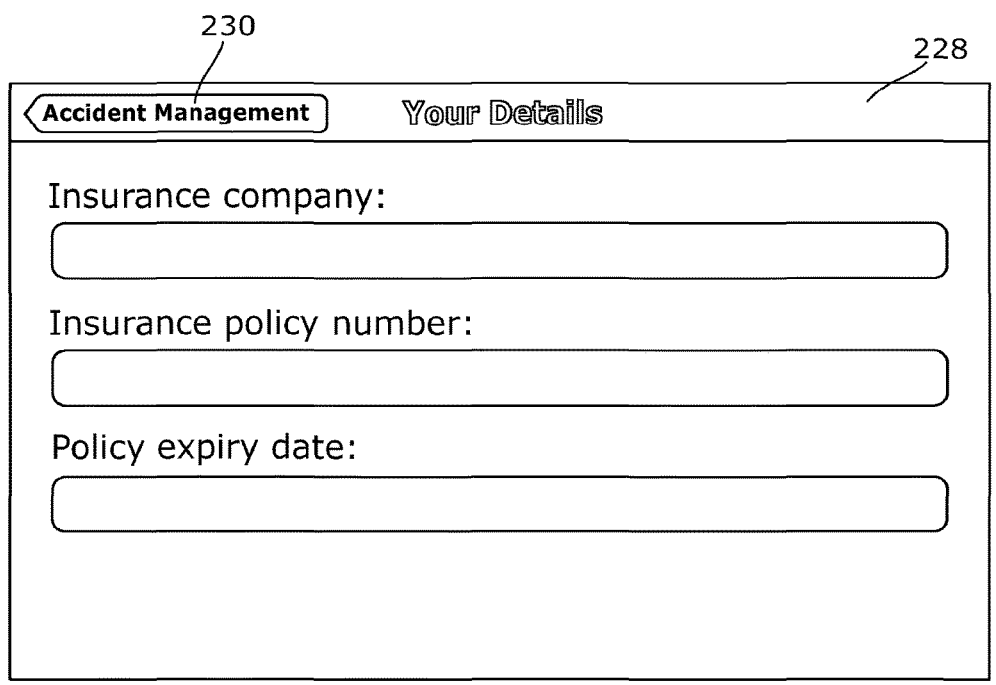

This option provides a readily available store of the details of the user—as to be provided to other drivers—and can contain name, address and insurance details. The 'Your Details' screen 228 is shown in FIG. 19.

Details recorded via the Accident Management Screen 212 are electronically authenticated and feature a time-stamp. In alternatives, this data may be encrypted to ensure the integrity of the stored data.

Furthermore, in alternatives, the exchange of the details of the drivers and witnesses can be conducted, at least in part, via Bluetooth® (for example, between mobile devices)—and/or via email. Relevant information associated with the driver is pre-stored on the Witness application in a format that can be sent readily, via a communication channel such as Bluetooth® or email.

Finally, note that in each Screen or Menu, there is a button 230 provided to go back to the previous menu. Also, when certain actions are performed or selected by a user, the Witness application is arranged to provide an audible feedback signal (for example, a beep). For example, this could be in response to starting a recording, keeping a video segment and/or a stopped recording.

Alternatives and Extensions

The Witness application can be extended to interface with remote users to allow them to control the operation of the application as well as view information logged by the application.

In particular, the present application can be extended to a scenario where the Witness application is under the control of an insurance company. Such an insurance company may provide insurance to the user, and so may have an interest in the behaviour of that user, and moreover, a vehicle under the control of that user, as described previously.

In such a scenario, the insurance company will maintain a device monitoring system that can interface with a mobile device running the Witness application. In fact, the device monitoring system may interface with a large number of mobile devices, each running an individual copy of the Witness application, logging respective user/vehicle behaviours. This could the insurance provider server 5 of FIG. 1.

With such a monitoring system, it is unpractical to actively monitor each and every mobile device and receiving and handling the sheer quantity of data from each and every device would also be very difficult.

Consequently, the device monitoring system and the mobile devices are advantageously arranged to automatically and intelligently interface with one another in a way that minimises the computational and bandwidth burden on the device monitoring system.

In particular, each mobile device running the Witness application is arranged to make a determination as to whether there is a need to transfer data to the device monitoring system. For example, the Witness application may be arranged to automatically send data to the device monitoring system that only has high G-force activity associated with it, as this may be indicative of a crash or another driving incident. Alternatively, the Witness application may be arranged to send detailed or high-bandwidth information if a user indicates that an accident has occurred.

In either case, the video segments and associated sensor and/or derived driving information data associated with the relevant event will be sent. However, no other data (for example, from another date) will be sent.

Alternatively, less computationally or bandwidth intensive information may be sent on a periodic basis—for example, every day, week or month. Such general information may be sent to establish a profile of a particular user. For example, many high G-force related activities may indicate that the driver is driving aggressively. A determination about the profile can be made automatically by requesting and automatically analysing further data. For example, the location and speed information can be used to determine whether a vehicle is found to frequently break the speed limit. If this is the case, then the profile of the user can be set accordingly.

Such general and periodically obtained information can also be used to remotely adjust the settings of the application. For example, many high G-force related activities may instead indicate that the set up of the car is such that the mobile device is subjected to high G forces (rather than the driver driving aggressively). If the driving is determined to be safe, but the mobile device is setting off many false positives, then the device monitoring system can automatically adjust the settings of the application. For example, the G-force sensitivity threshold may be increased remotely.

Thus, the initial data that is automatically transmitted from the mobile device to the vehicle monitoring system is limited in bandwidth so as not to overload the vehicle monitoring system as a whole. However, after processing or analysis is performed on the initial data, further information may be requested. For example, further information may be requested automatically by the system or manually by a controller acting for the insurance company. Such further information may include high resolution video logs and sensor data and derived driving information such as G-force measurements.

It will be understood that the mobile device may also automatically keep certain data at random. Furthermore, the reason for keeping certain data may also be logged (e.g. logged as a result of a manual request by the user, or in response to a high G-force event).

The mobile device and device monitoring system may also be arranged to highlight detected transgressions. For example, driving during curfew hours, or driving at locations where insurance is not valid (e.g. other countries, off-road, race tracks etc).

As will be appreciated, the interaction of the mobile device and the device monitoring system has the advantage of actively improving user driving behaviour. That is, if the user knows that their logged driving behaviour may adversely effect their insurance policy, then it is likely that the user will be dissuaded from driving recklessly. In view of this, an insurance company may be able to incentivise users through lower insurance premiums.

However, so that users do not wrongfully benefit from such incentives, it is necessary to enforce the correct and consistent use of the Witness application.

It would not be beneficial from the perspective of the insurance company if the user could choose when to enable the application. For example, if a user could choose to disable the application when speeding then the effectiveness of the application would be reduced.

Accordingly, the application may include measures to guarantee that the application is enabled whenever a given insured vehicle is being driven.

Such measures may involve matching data recorded by the Witness application with that recorded independently by the vehicle. For example, the Witness application records the distance travelled during every journey. To ensure the summed distances of all journeys tracked by the Witness application tally with the total travelled distance of the vehicle, the user may be prompted to enter the odometer mileage periodically.

If the distance recorded by the Witness application does not correlate with the difference between odometer readings, then the discrepancy will be flagged to the user and/or the insurance company. A substantial discrepancy will typically indicate that the Witness application has not been monitoring all vehicle journeys and the appropriate action can be taken (e.g. the user can be warned, insurance premium may be raised etc).

It will be appreciated that such a tallying exercise depends on the Witness application being used every time one particular vehicle is driven. However, in alternatives, if the Witness application is used with different vehicles, the Witness application may be arranged to register the different vehicles so that their respective odometer readings can be tallied with distance recordings associated with each respective vehicle.

Other measures can be implemented in conjunction with the Witness application to guarantee that the application is enabled whenever a given vehicle is being driven. For example, the mobile device on which the Witness application is installed may comprise an NFC device, such as an RFID tag. The NFC device may be compatible with a complementary device on a so-called 'smart-holster' into which the mobile device may be fitted during operation.

The smart-holster interacts with the NFC device on the smart-phone to determine whether or not the smart-phone is inserted into the smart-holster. The smart-holster can then be interfaced with the engine management system of the vehicle so that the vehicle may be activated and driven only when the mobile device is in place within the smart-holster.

It will be appreciated that the mobile device has so far been described in the context of a smart-phone. However, it will be appreciated by a person skilled in the art that other devices may also be suitable for performing the functions described in relation to the Witness application. For example, the Witness application may be adapted to run on a general purpose tablet-style computing device, such as an iPad®.

Furthermore, it will be understood that features, advantages and functionality of the different embodiments described herein may be combined where context allows. In addition, a skilled person will appreciated that the functionality described above may be implemented using the mobile device suitably programmed.

Having described several exemplary embodiments of the present invention and the implementation of different functions of the device in detail, it is to be appreciated that the skilled addressee will readily be able to adapt the basic configuration of the device to carry out described functionality without requiring detailed explanation of how this would be achieved. Therefore, in the present specification several functions of the device have been described in different places without an explanation of the required detailed implementation as this not necessary given the abilities of the skilled addressee to code functionality into the device.

The invention claimed is:

1. A mobile telecommunications device configured to log driving information associated with a vehicle, the mobile telecommunications device comprising:
    a sensor set comprising an image sensor, an audio sensor, an accelerometer or a positioning module, or a combination thereof;
    a user interface;
    a processor and;
    a memory;
    the mobile telecommunications device being configured to:
    determine, based on at least one of the inputs received by the user interface and sensor data from the device's sensor set, a start of a driving period during which the mobile device is removably attached to the vehicle and the vehicle is in use;
    process the sensor data from the sensor set during the driving period to derive driving information associated with how the vehicle is driven; and
    store a selection of the driving information to the memory;
    wherein the driving information is derived without data from the vehicle sensors, and the mobile telecommunications device is controlled by a downloaded application to control the mobile device to process the driving information to generate a driving score associated with a particular driver.

2. A mobile telecommunications device according to claim 1, wherein the mobile telecommunications device is controlled by the downloaded application to control the mobile device to detect occurrence of a predetermined event and in response take at least one predetermined action.

3. A mobile telecommunication device according to claim 2, wherein predetermined action is storing driving information associated with that event to the memory.

4. A mobile telecommunication device according to claim 2, wherein predetermined action is storing driving information captured at a higher sampling rate than when an event is not detected.

5. A mobile telecommunication device according to claim 2, wherein predetermined action is transmitting driving information via a wireless telecommunication module of the mobile telecommunication device to a remote system.

6. A mobile telecommunications device according to claim 2, wherein the predetermined action comprises providing feedback to a user to indicate that an event has been detected, the mobile telecommunications device being configured to receive a user interaction to confirm or deny whether the detected event has actually occurred following said feedback.

7. A mobile telecommunications device according to claim 6, wherein the feedback comprises notifying a user that a further action has been scheduled, and will be taken within a predetermined period, the mobile telecommunications device being further configured to receive a user interaction to confirm or deny whether the further scheduled action should be taken within a predetermined period.

8. A mobile telecommunications device according to claim 2, wherein the predetermined action comprises communicating to a remote system that an event has been detected, the mobile telecommunications device being further configured to receive from the remote system a request to transmit to the remote system selected portions of the driving information associated with the detected event.

9. A mobile telecommunications device according to claim 2, wherein the memory comprises:
    a long term memory for persistently storing driving information and a short term memory for transiently storing driving information, wherein the short term memory receives driving information at a higher update rate than the long term memory, the mobile telecommunications device being further configured to:
    write driving information to the short term memory at a predetermined update rate during the driving period in a predetermined sequence; and,
    overwrite the driving information previously written to the short term memory in accordance with the predetermined sequence.

10. A mobile telecommunications device according to claim 9, wherein the mobile telecommunications device is controlled by the downloaded application to control the mobile device to detect an occurrence of a predetermined event and in response transfer data from the short term memory to the long term memory.

11. A mobile telecommunications device according to claim 2, wherein the device is controlled by the downloaded application to manage voice-calls incoming to the mobile telecommunications device during a driving period.

12. A mobile telecommunications device according to claim 2, wherein the device is controlled by the downloaded application to enable a hands-free mode of operation on detection of the driving period.

13. A mobile telecommunications device according to claim 12, wherein the hands-free mode of operation comprises enabling voice-activated commands on the mobile device.

14. A mobile telecommunications device according to claim 2, wherein the device is controlled by the downloaded application to detect the occurrence of a predetermined event of significance, such as a crash, and in response to store driving information associated with that event to the memory.

15. A mobile telecommunications device according to claim 2, wherein the device is controlled by the downloaded application to detect the occurrence of a predetermined event of significance, such as a crash, and in response to transmit driving information associated with that event via the wireless telecommunication module to a remote data-logging system.

16. A mobile telecommunications device according to claim 2, wherein the at least one predetermined action comprises providing the user with options to control the mobile device to take further actions.

17. A mobile telecommunications device according to claim 1, further configured to:
   interface with an external device, the external device having access to external driving information associated with a condition of the vehicle; and,
   to receive at least a portion of the external driving information from the external device.

18. A mobile telecommunications device according to claim 17, further arranged to interface with the external device wirelessly.

19. A mobile telecommunications device according to claim 1, wherein the mobile telecommunications device utilizes its own power supply.

20. A mobile telecommunications device according to claim 1, wherein the mobile telecommunications device is a smartphone.

21. A non-transitory computer readable medium having instructions comprising a software application stored thereon, wherein the instructions are configured to be executed on a processor of a mobile telecommunications device to enable the mobile telecommunications device to log driving information associated with a driver of a vehicle, the mobile telecommunications device including a display; a sensor set comprising an image sensor, an audio sensor, an accelerometer or a positioning module, or a combination thereof; the processor; and a memory, wherein the instructions, upon execution by the processor, enable the mobile telecommunications device to:
   present a user interface on the display;
   determine, based on at least one of the inputs received by the user interface and/or sensor data from the sensor set, a start of a driving period during which the mobile telecommunications device is removably attached to a vehicle and the vehicle is being driven by the driver;
   process the sensor data from the sensor set during the driving period to derive driving information associated with how the vehicle is driven;
   store a selection of the driving information to the memory; and
   generate a driving score associated with the driver,
   wherein the driving information is derived without data from vehicle sensors.

22. A non-transitory computer readable medium according to claim 21, wherein execution of the instructions further enables the mobile telecommunications device to detect occurrence of a predetermined event and in response take at least one predetermined action.

23. A non-transitory computer readable medium according to claim 22, wherein predetermined action is storing driving information associated with that event to the memory.

24. A non-transitory computer readable medium according to claim 22, wherein predetermined action is storing driving information captured at a higher sampling rate than when an event is not detected.

25. A non-transitory computer readable medium according to claim 22, wherein predetermined action is transmitting driving information via a wireless telecommunication module of the mobile telecommunication device to a remote system.

26. A non-transitory computer readable medium according to claim 22, wherein the predetermined action comprises providing feedback to a user to indicate that an event has been detected, the mobile telecommunications device being configured, via execution of the instructions, to receive a user interaction to confirm or deny whether the detected event has actually occurred following said feedback.

27. A non-transitory computer readable medium according to claim 26, wherein the feedback comprises notifying a user that a further action has been scheduled, and will be taken within a predetermined period, the mobile telecommunications device being further configured to receive a user interaction to confirm or deny whether the further scheduled action should be taken within a predetermined period.

28. A non-transitory computer readable medium according to claim 22, wherein the predetermined action comprises communicating to a remote system that an event has been detected, wherein execution of the instructions further enables the mobile telecommunications device to receive from the remote system a request to transmit to the remote system selected portions of the driving information associated with the detected event.

29. A non-transitory computer readable medium according to claim 22, wherein execution of the instructions further enables the mobile telecommunications device to manage voice-calls incoming to the mobile telecommunications device during a driving period.

30. A non-transitory computer readable medium according to claim 22, wherein execution of the instructions further enables the mobile telecommunications device to enable a hands-free mode of operation on detection of the driving period.

31. A non-transitory computer readable medium according to claim 30, wherein the hands-free mode of operation comprises enabling voice-activated commands on the mobile device.

32. A non-transitory computer readable medium according to claim 22, wherein execution of the instructions further enables the mobile telecommunications device to detect the occurrence of a predetermined event of significance, such as a crash, and in response to store driving information associated with that event to the memory.

33. A non-transitory computer readable medium according to claim 22, wherein execution of the instructions further enables the mobile telecommunications device to detect the occurrence of a predetermined event of significance, such as a crash, and in response to transmit driving information associated with that event via the wireless telecommunication module to a remote data-logging system.

34. A non-transitory computer readable medium according to claim 22, wherein the at least one predetermined action comprises providing the user with options to control the mobile device to take further actions.

35. A non-transitory computer readable medium according to claim 21, wherein the memory comprises:
a long-term memory for persistently storing driving information and a short-term memory for transiently storing driving information, wherein the short-term memory receives driving information at a higher update rate than the long-term memory, wherein execution of the instructions further enables the mobile telecommunications device to:
write driving information to the short-term memory at a predetermined update rate during the driving period in a predetermined sequence; and,
overwrite the driving information previously written to the short-term memory in accordance with the predetermined sequence.

36. A non-transitory computer readable medium according to claim 35, wherein execution of the instructions further enables the mobile telecommunications device to detect an occurrence of a predetermined event and in response transfer data from the short-term memory to the long-term memory.

37. A non-transitory computer readable medium according to claim 21, wherein execution of the instructions further enables the mobile telecommunications device to:
interface with an external device, the external device having access to external driving information associated with a condition of the vehicle; and,
receive at least a portion of the external driving information from the external device.

38. A non-transitory computer readable medium according to claim 37, further arranged to interface with the external device wirelessly.

39. A non-transitory computer readable medium according to claim 21, wherein the mobile telecommunications device utilizes its own power supply.

40. A non-transitory computer readable medium according to claim 21, wherein the mobile telecommunications device is a smartphone.

41. A non-transitory computer readable medium according to claim 21, wherein the processing step comprises determination of at least one of: vehicle acceleration events and vehicle braking events.

42. A non-transitory computer readable medium according to claim 41, wherein processing step comprises determination of vehicle swerving events and the determination of such events occurs when data from the sensor set accords with preset parameters.

43. A non-transitory computer readable medium according to claim 21, wherein the processing step comprises determination of both vehicle acceleration events and vehicle braking events.

44. A non-transitory computer readable medium according to claim 43, wherein processing step comprises the determination of vehicle swerving events and the determination of such events occurs when data from the sensor set accords with preset parameters.

45. A non-transitory computer readable medium according to claim 21, wherein the mobile telecommunications device further comprises a proximity sensor and the instructions, upon execution by the processor, enable the mobile telecommunications device to detect the proximity of the mobile telecommunications device to the vehicle.

46. A mobile telecommunications device configured to log driving information associated with a vehicle, the mobile telecommunications device comprising:
a sensor set comprising an image sensor, an audio sensor, an accelerometer or a positioning module, or a combination thereof;
a user interface;
a processor and;
a memory;
the mobile telecommunications device being configured to:
determine, based on at least one of the inputs received by the user interface and sensor data from the device's sensor set, a start of a driving period during which the mobile device is removably attached to the vehicle and the vehicle is in use;
process the sensor data from the sensor set during the driving period to derive driving information associated with how the vehicle is driven; and
store a selection of the driving information to the memory;
wherein the driving information is derived without data from the vehicle sensors and the mobile telecommunications device is configured to process the sensor data by determination of at least one of:
vehicle acceleration events; and
vehicle braking events;
wherein the determining of such events occurs when data from the sensor set accords with predefined threshold values; and
wherein the mobile telecommunications device is controlled by a downloaded application to control the mobile device to process the driving information to generate a driving score associated with a particular driver.

47. A mobile telecommunications device according to claim 46, wherein the mobile telecommunications device is configured to process the sensor data by determination of vehicle swerving events and the determination of such events occurs when data from the sensor set accords with preset parameters.

48. A mobile telecommunications device according to claim 46, wherein the mobile telecommunications device is configured to process the sensor data by determination of both vehicle acceleration events and vehicle braking events.

49. A mobile telecommunications device according to claim 48, wherein the mobile telecommunications device is configured to process the sensor data by determination of vehicle swerving events and the determination of such events occurs when data from the sensor set accords with preset parameters.

50. A mobile telecommunications device according to claim 46, wherein the mobile telecommunications device further comprises a proximity sensor and the mobile telecommunications device is configured, upon execution of the instructions by the processor, to enable the mobile telecommunications device to detect the proximity of the mobile telecommunications device to the vehicle.

51. A non-transitory computer readable medium having instructions comprising a software application stored thereon, wherein the instructions are configured to be executed on a processor of a mobile telecommunications device to enable the mobile telecommunications device to log driving information associated with a driver of a vehicle, the mobile telecommunications device including a display; a sensor set comprising an image sensor, an audio sensor, an accelerometer or a positioning module, or a combination thereof; the processor; and a memory, wherein the instructions, upon execution by the processor, enable the mobile telecommunications device to:

present a user interface on the display;
determine, based on at least inputs received by the user interface and sensor data from the sensor set, a start of a driving period during which the mobile telecommunications device is removably attached to a vehicle and the vehicle is being driven by the driver;
process the sensor data from the sensor set during the driving period to derive driving information associated with how the vehicle is driven;
store a selection of the driving information to the memory; and
generate a driving score associated with the driver,
wherein the driving information is derived without data from vehicle sensors and comprises the determination of at least one of:
vehicle acceleration events; and
vehicle braking events;
wherein the determination of such events occurs when data from the sensor set accords with predefined threshold parameters.

52. A non-transitory computer readable medium according to claim 51, wherein the derived driving information may further comprise the determination of vehicle swerving events and the determination of such events occurs when data from the sensor set accords with predefined threshold parameters.

53. A non-transitory computer readable medium according to claim 51, wherein the mobile telecommunications device further includes a proximity sensor, and the instructions, upon execution by the processor, further enable the mobile telecommunications device to detect the proximity of the mobile telecommunications device to the vehicle.

54. A mobile telecommunications device configured to log driving information associated with a vehicle, the mobile telecommunications device comprising:
a sensor set comprising an image sensor, an audio sensor, an accelerometer or a positioning module, or a combination thereof;
a user interface;
a processor and;
a memory;
the mobile telecommunications device being configured to:
determine, based on at least one of the inputs received by the user interface and sensor data from the device's sensor set, a start of a driving period during which the mobile device is removably affixed to the vehicle and the vehicle is in use;
process the sensor data from the sensor set during the driving period to derive driving information associated with how the vehicle is driven; and
store a selection of the driving information to the memory;
wherein the driving information is derived without data from the vehicle sensors, and the mobile telecommunications device is controlled by a downloaded application to control the mobile device to process the driving information to generate a driving score associated with a particular driver.

55. A mobile telecommunications device configured to log driving information associated with a vehicle, the mobile telecommunications device comprising:
a sensor set comprising an image sensor, an audio sensor, an accelerometer or a positioning module, or a combination thereof;
a user interface;
a processor and;
a memory;
the mobile telecommunications device being configured to:
determine, based on at least one of the inputs received by the user interface and sensor data from the device's sensor set, a start of a driving period during which the mobile device is removably affixed to the vehicle and the vehicle is in use;
process the sensor data from the sensor set during the driving period to derive driving information associated with how the vehicle is driven, the processing involving the use of a neural network on the mobile telecommunications device to determine whether the driving information represents an acceptable or unacceptable driving pattern; and,
store a selection of the driving information to the memory;
wherein the driving information is derived without data from the vehicle sensors, and the mobile telecommunications device is controlled by a downloaded application to control the mobile device to process the driving information to generate a driving score associated with a particular driver.

* * * * *

(12) INTER PARTES REVIEW CERTIFICATE (3916th)
United States Patent
Wright

(10) Number: US 10,198,879 K1
(45) Certificate Issued: Feb. 28, 2025

(54) METHOD AND SYSTEM FOR LOGGING VEHICLE BEHAVIOR

(71) Applicant: Andrew William Wright

(72) Inventor: Andrew William Wright

(73) Assignee: AUTO TELEMATICS LTD.

Trial Number:

IPR2023-00857 filed May 4, 2023

Inter Partes Review Certificate for:

Patent No.: 10,198,879
Issued: Feb. 5, 2019
Appl. No.: 15/454,952
Filed: Mar. 9, 2017

The results of IPR2023-00857 are reflected in this inter partes review certificate under 35 U.S.C. 318(b).

INTER PARTES REVIEW CERTIFICATE
U.S. Patent 10,198,879 K1
Trial No. IPR2023-00857
Certificate Issued Feb. 28, 2025

AS A RESULT OF THE INTER PARTES REVIEW PROCEEDING, IT HAS BEEN DETERMINED THAT:

Claims 1-55 are cancelled.

\* \* \* \* \*